United States Patent
Shima et al.

(10) Patent No.: US 10,743,017 B2
(45) Date of Patent: Aug. 11, 2020

(54) ENCODING INCLUDING TRANSFORM AND QUANTIZATION, OR DECODING INCLUDING INVERSE-TRANSFORM AND INVERSE-QUANTIZATION

(71) Applicant: CANON KABUSHIKI KAISHA, Tokyo (JP)

(72) Inventors: Masato Shima, Tokyo (JP); Mitsuru Maeda, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 307 days.

(21) Appl. No.: 14/758,202

(22) PCT Filed: Dec. 25, 2013

(86) PCT No.: PCT/JP2013/007565
§ 371 (c)(1),
(2) Date: Jun. 26, 2015

(87) PCT Pub. No.: WO2014/103294
PCT Pub. Date: Jul. 3, 2014

(65) Prior Publication Data
US 2016/0198175 A1   Jul. 7, 2016

(30) Foreign Application Priority Data
Dec. 28, 2012 (JP) ................ 2012-287785

(51) Int. Cl.
H04N 7/12 (2006.01)
H04N 19/50 (2014.01)
(Continued)

(52) U.S. Cl.
CPC .......... *H04N 19/50* (2014.11); *H04N 19/124* (2014.11); *H04N 19/126* (2014.11);
(Continued)

(58) Field of Classification Search
CPC .... H04N 19/50; H04N 19/124; H04N 19/172; H04N 19/18; H04N 19/184; H04N 19/45;
(Continued)

(56) References Cited

U.S. PATENT DOCUMENTS 5,126,841 A   6/1992 Tanaka et al.
5,778,192 A   7/1998 Schuster et al.
(Continued)

FOREIGN PATENT DOCUMENTS

CN   101617539 A   12/2009
EP   0784408 B1   6/2006
(Continued)

OTHER PUBLICATIONS

ITU-T Telecommunication Standardization Sector of ITU, H.264 (Jun. 2011), Series H: Audiovisual and Multimedia Systems Infrastructure of audiosvisual services—Coding of moving video, "Advanced video coding for generic audiovisual services", p. 289.
(Continued)

*Primary Examiner* — Richard T Torrente
(74) *Attorney, Agent, or Firm* — Canon U.S.A., Inc. IP Division

(57) ABSTRACT

An image encoding device configured to perform prediction for a received image for each block on the basis of encoded pixels to generate prediction errors, a transform and quantization unit configured to perform orthogonal transform and quantization on the prediction errors to generate quantization coefficients, a coefficient encoding unit configured to encode the quantization coefficients, an arithmetic precision information generating unit configured to generate arithmetic precision selection information representing selection of arithmetic precision of at least one of the prediction, the orthogonal transform, and the quantization, and an arithmetic precision encoding unit configured to encode the arithmetic precision selection information.

42 Claims, 20 Drawing Sheets

(51) Int. Cl.
*H04N 19/61* (2014.01)
*H04N 19/126* (2014.01)
*H04N 19/70* (2014.01)
*H04N 19/423* (2014.01)
*H04N 19/124* (2014.01)
*H04N 19/172* (2014.01)
*H04N 19/18* (2014.01)
*H04N 19/184* (2014.01)
*H04N 19/44* (2014.01)

(52) U.S. Cl.
CPC ........... *H04N 19/172* (2014.11); *H04N 19/18* (2014.11); *H04N 19/184* (2014.11); *H04N 19/423* (2014.11); *H04N 19/45* (2014.11); *H04N 19/61* (2014.11); *H04N 19/70* (2014.11)

(58) Field of Classification Search
CPC ...... H04N 19/61; H04N 19/70; H04N 19/126; H04N 19/423
USPC ...................................................... 375/240.12
See application file for complete search history.

(56) References Cited

U.S. PATENT DOCUMENTS

| | | | |
|---|---|---|---|
| 8,249,145 B2 | 8/2012 | Chang et al. | |
| 2001/0050959 A1 | 12/2001 | Nishio et al. | |
| 2007/0065023 A1* | 3/2007 | Lee | H04N 19/176 382/232 |
| 2008/0198925 A1 | 8/2008 | Sayre | |
| 2008/0198935 A1 | 8/2008 | Srinivasan et al. | |
| 2012/0014455 A1* | 1/2012 | Joshi | H04N 19/176 375/240.18 |
| 2012/0307903 A1 | 12/2012 | Sugio et al. | |
| 2013/0322527 A1* | 12/2013 | Guo | H03M 7/3059 375/240.03 |
| 2015/0172661 A1* | 6/2015 | Dong | H04N 19/51 375/240.03 |
| 2016/0286236 A1 | 9/2016 | Alshina et al. | |

FOREIGN PATENT DOCUMENTS

| | | |
|---|---|---|
| JP | 6324590 B2 | 5/2018 |
| KR | 10-2009-0115726 A | 11/2009 |
| KR | 10-2012-0046727 A | 5/2012 |
| RU | 2467499 C2 | 11/2012 |
| WO | 97/17797 A2 | 5/1997 |
| WO | 01/54417 A1 | 7/2001 |
| WO | 2007/114368 A1 | 10/2007 |

OTHER PUBLICATIONS

Hoang, Dzung, "Unified scaling with adaptive offset for reference frame compression", Joint Collaborative Team on Video Coding (JCT-VC) of ITU-T SG16 WP3 and ISO/IEC JTC1/SC29/WG11 6th Meeting: Torino, Jul. 14-22, 2011, Document: JCTVC-F075, pp. 1-15.

Chen et al., "Bit depth of output pictures", Joint Collaborative Team on Video Coding (JCT-VC) of ITU-T SG16 WP3 and ISO/IEC JTC1/SC29/WG11 8th Meeting: San Jose, CA USA, Feb. 1-10, 2012, Document: JCTVC-H0500, pp. 1-2.

JCT-VC contributions JCTVC-K1003_v10.doc Internet <http://phenix.int-evry.fr/jct/doc_end_user/documents/11_Shanghai/wg11/>.

* cited by examiner

[Fig. 1]
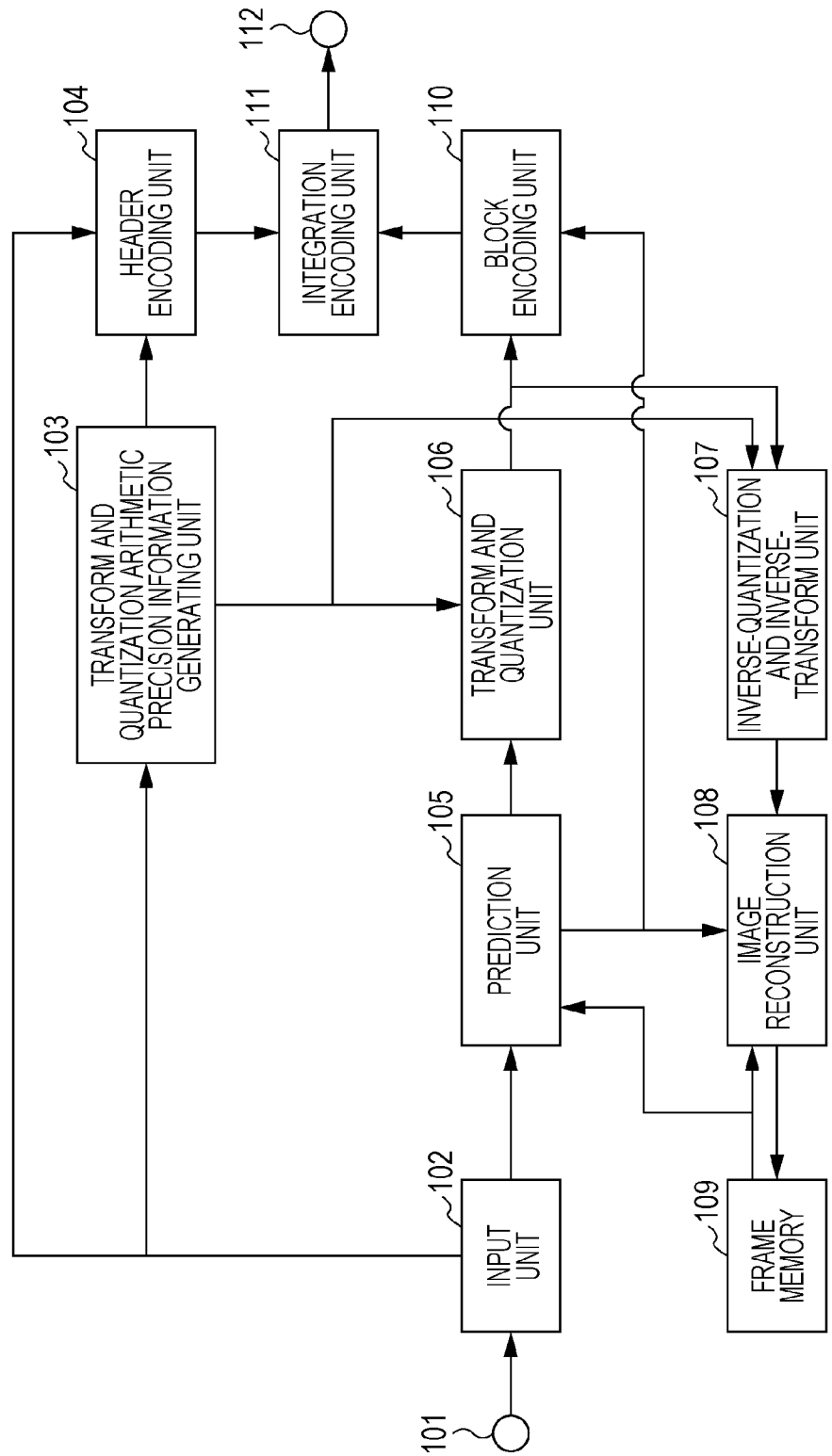

[Fig. 2]
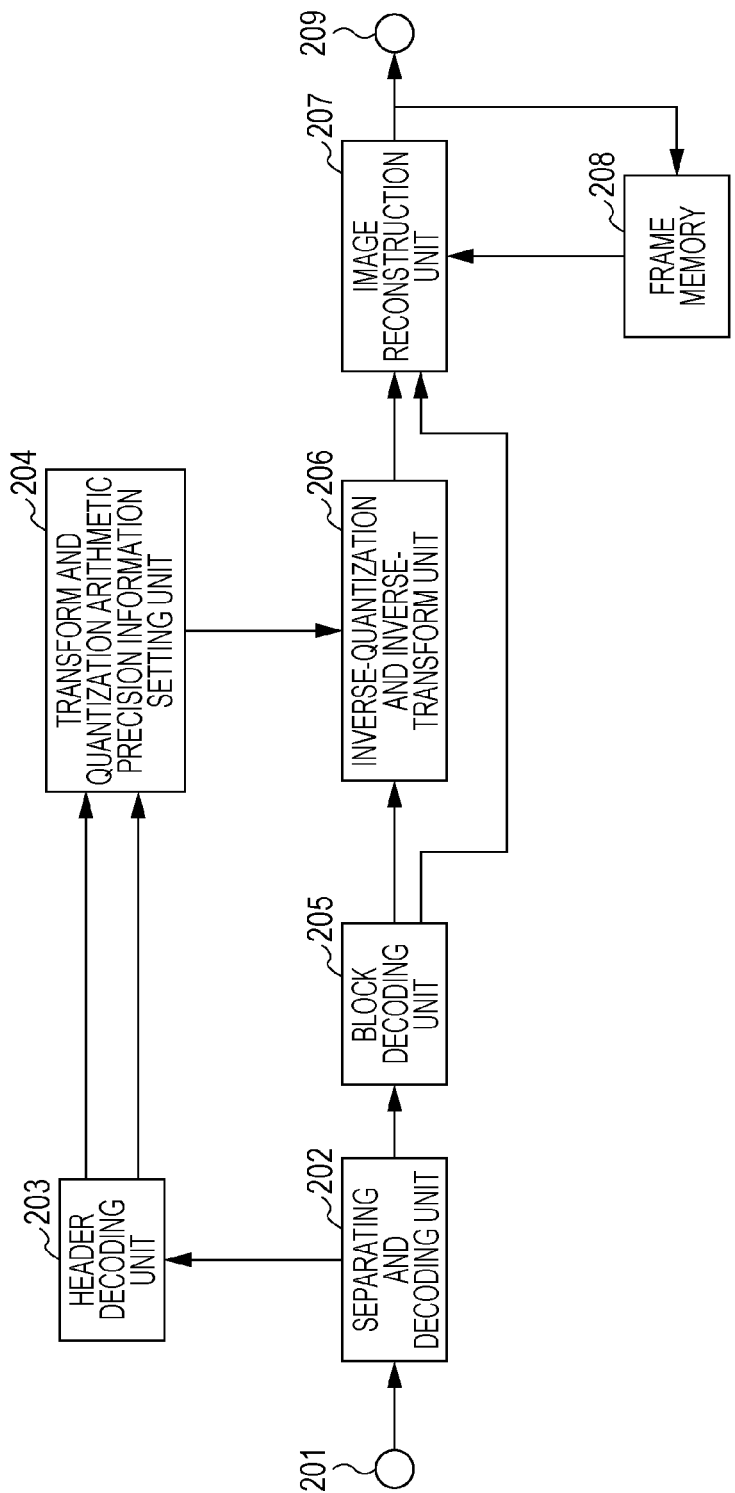

[Fig. 3]
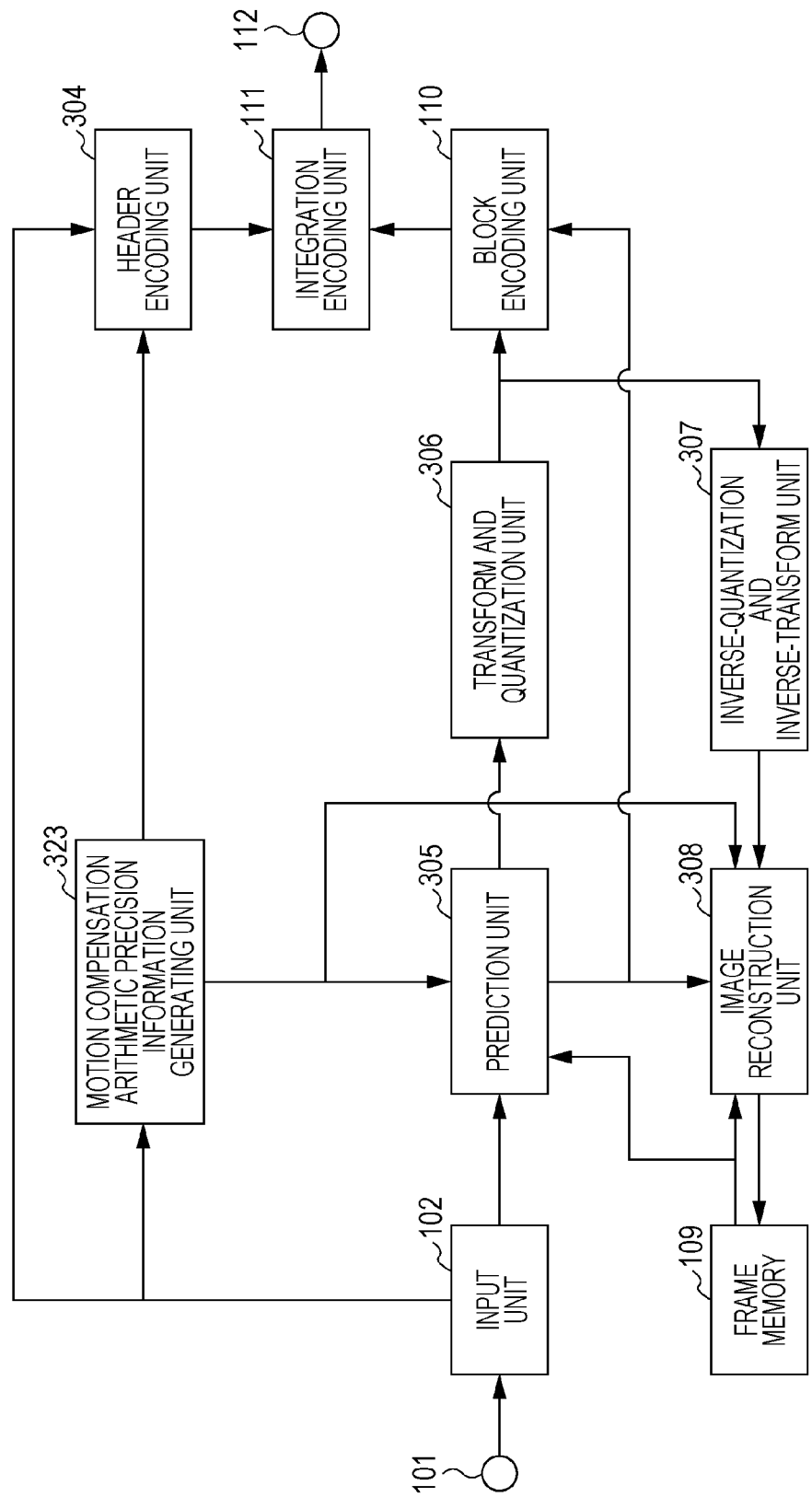

[Fig. 4]
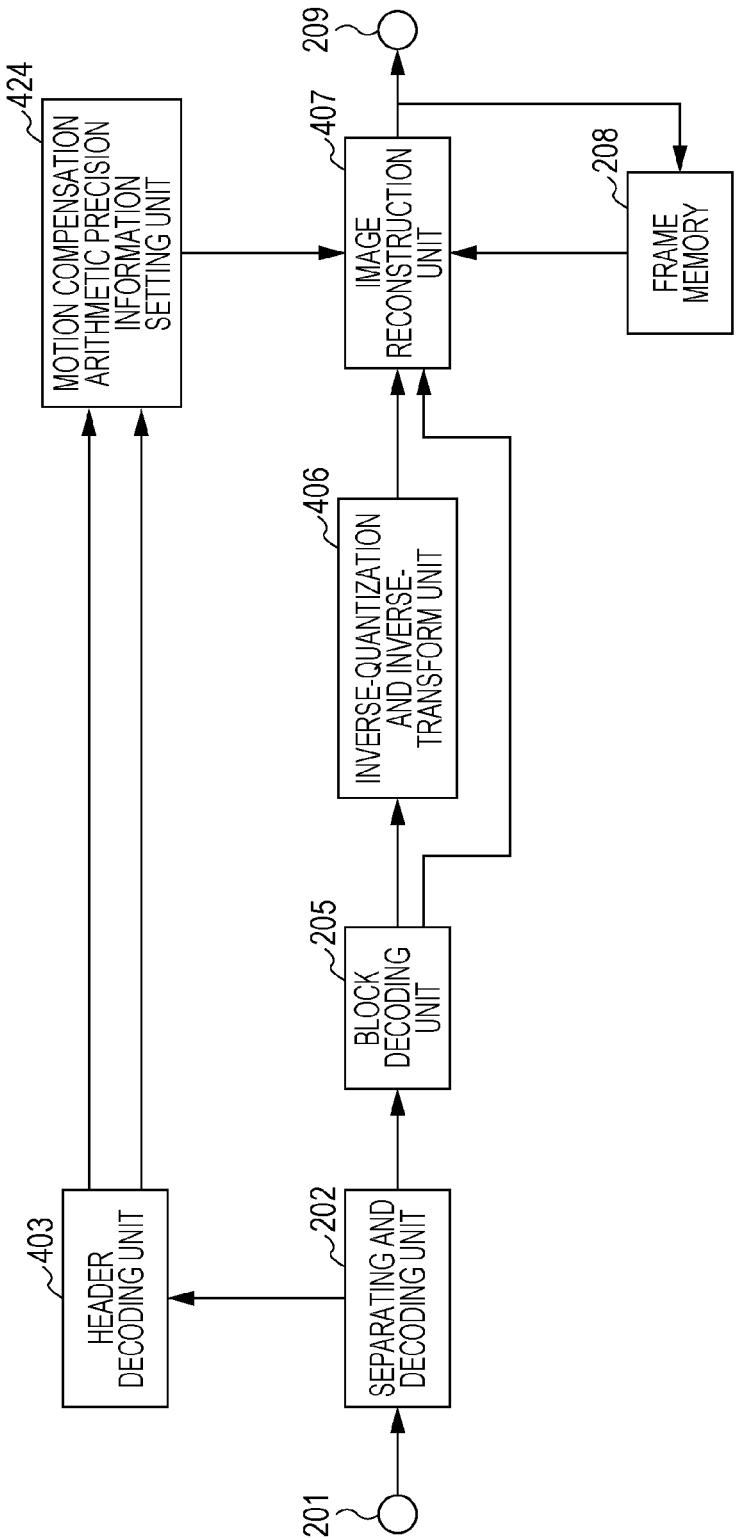

[Fig. 5]
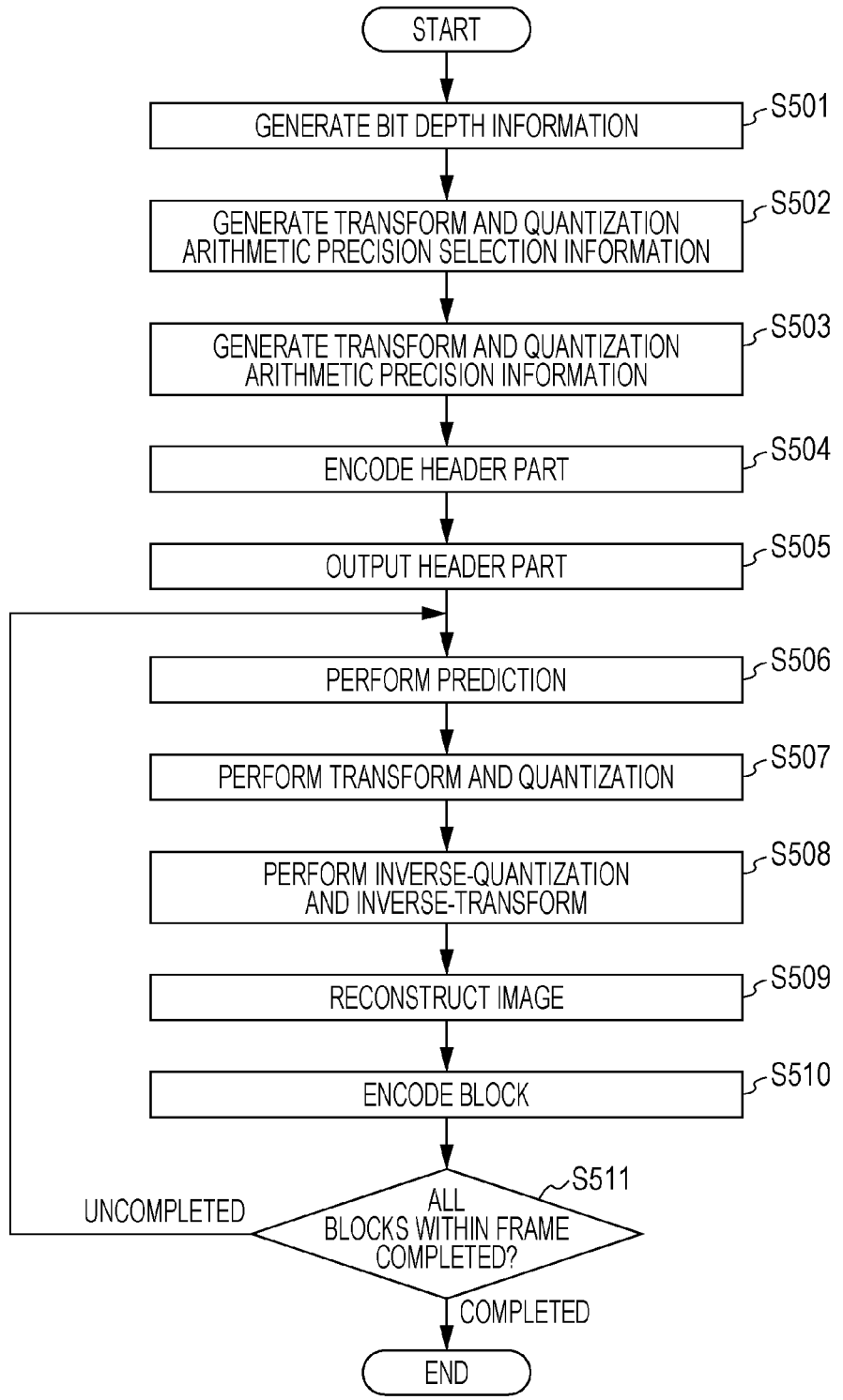

[Fig. 6]
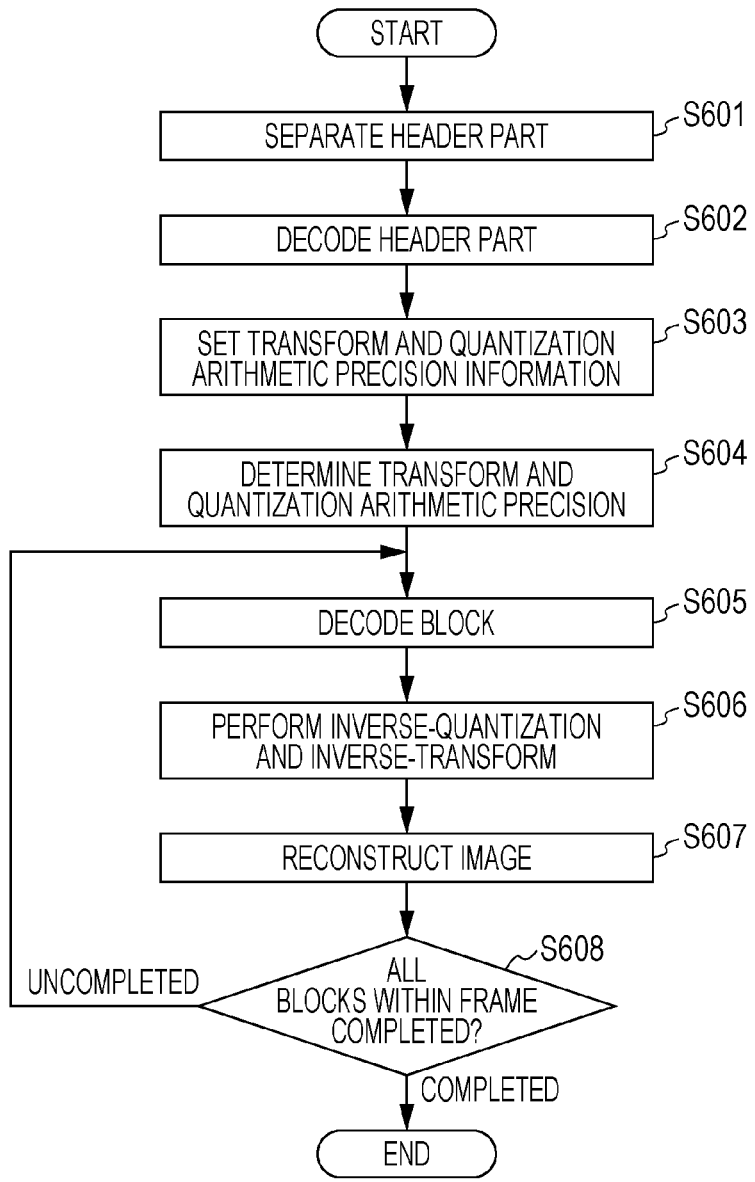

[Fig. 7]
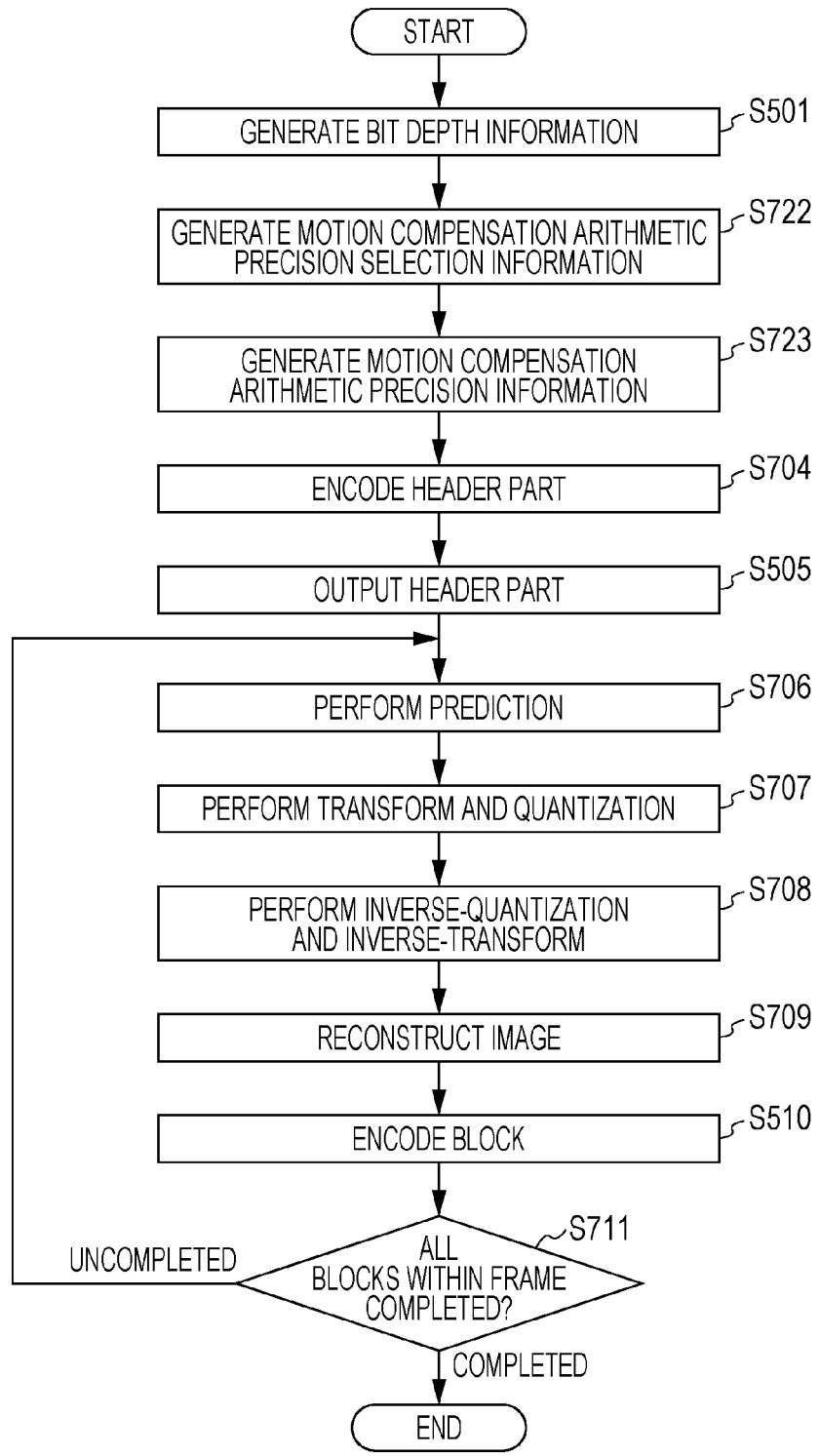

[Fig. 8]
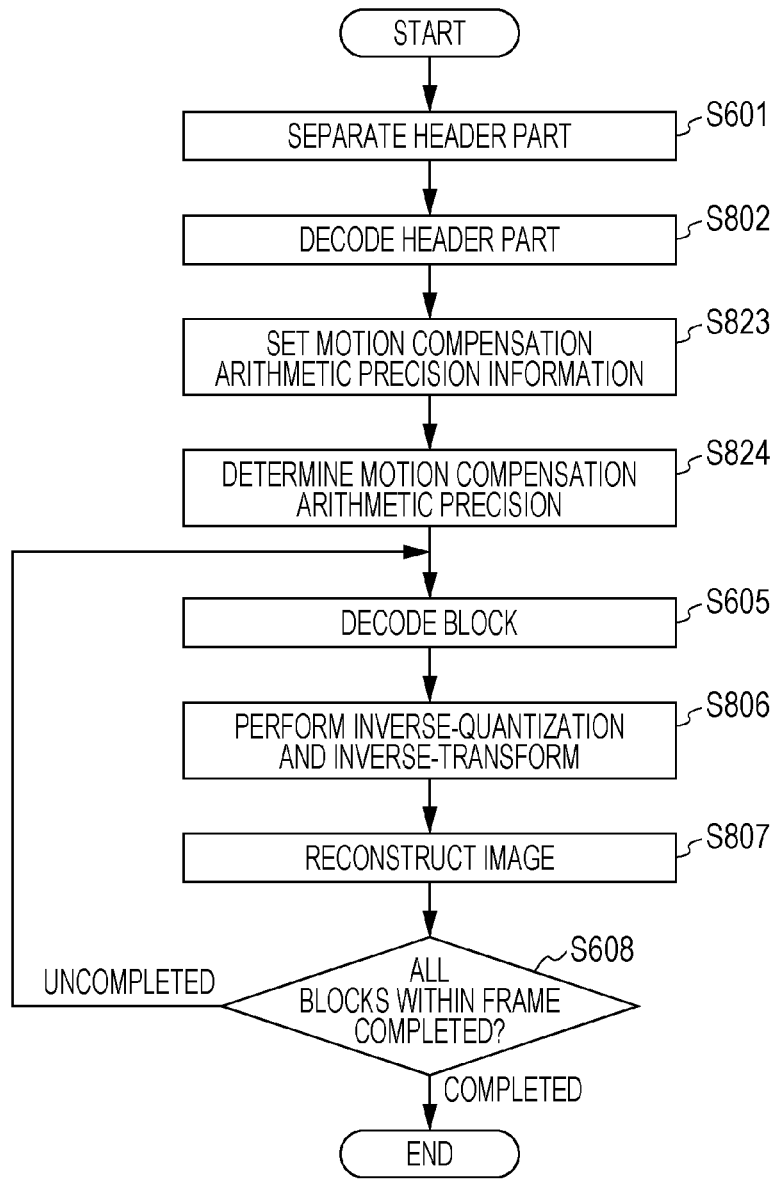

[Fig. 9]
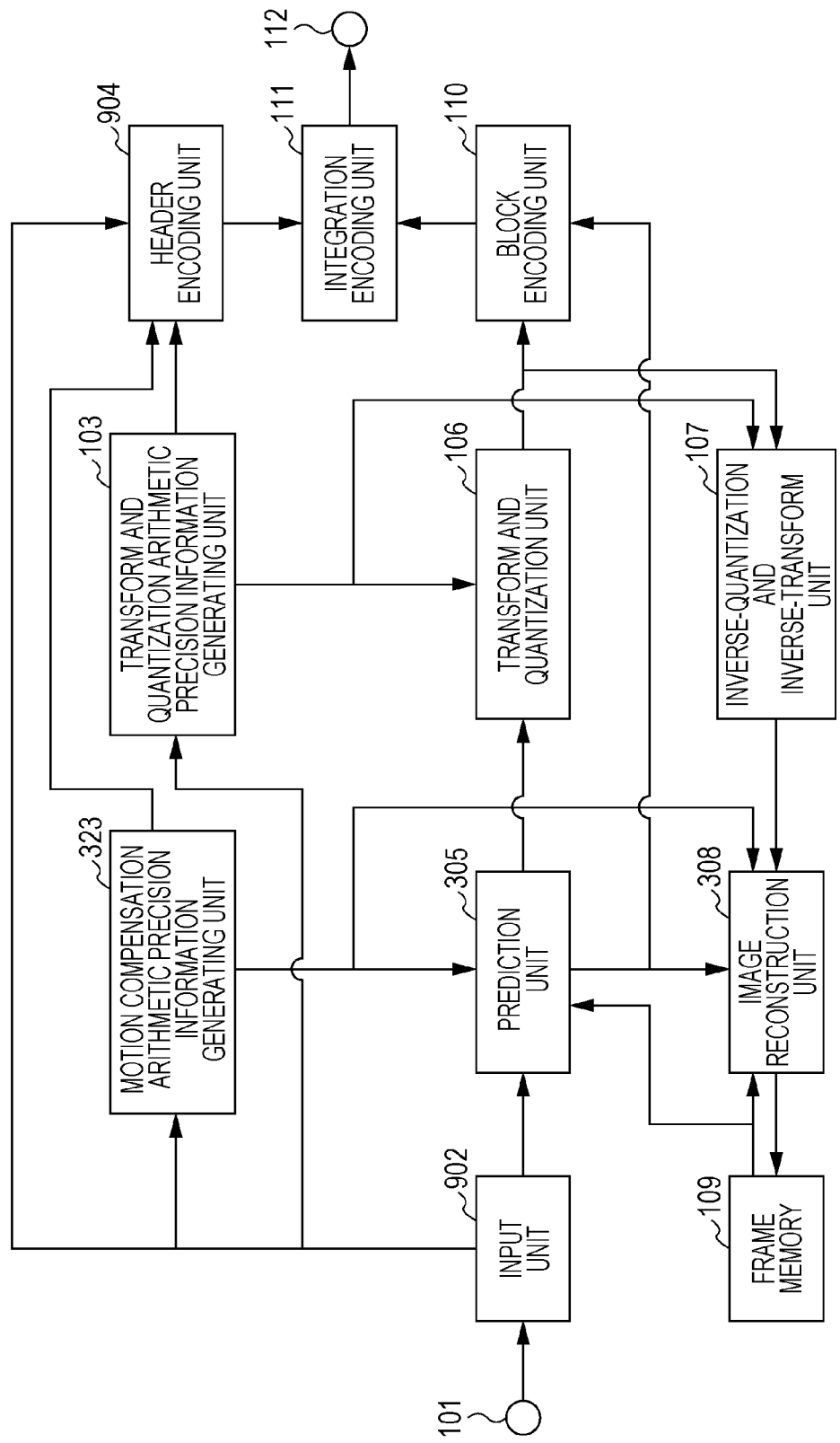

[Fig. 10]
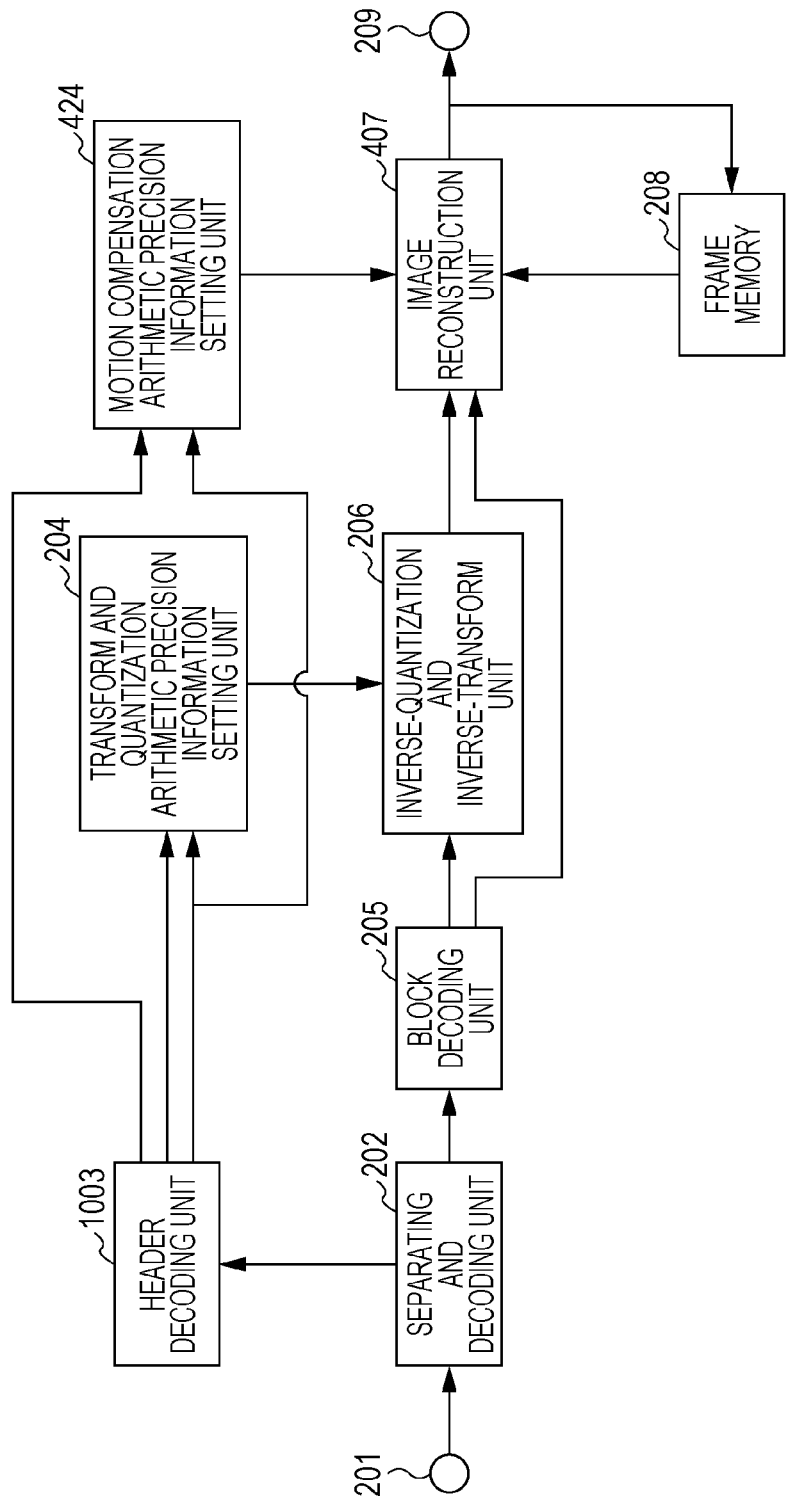

[Fig. 11]
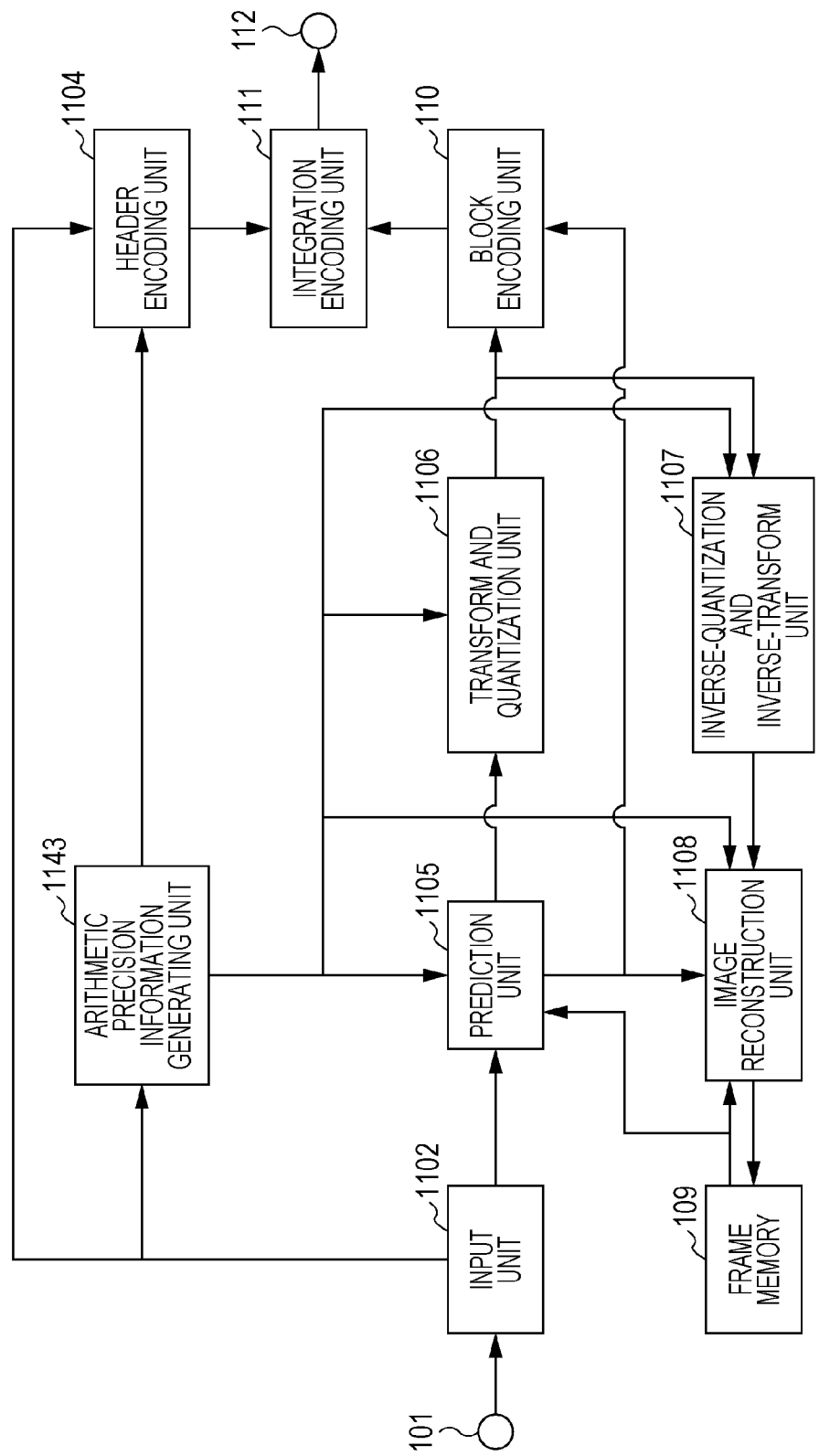

[Fig. 12]
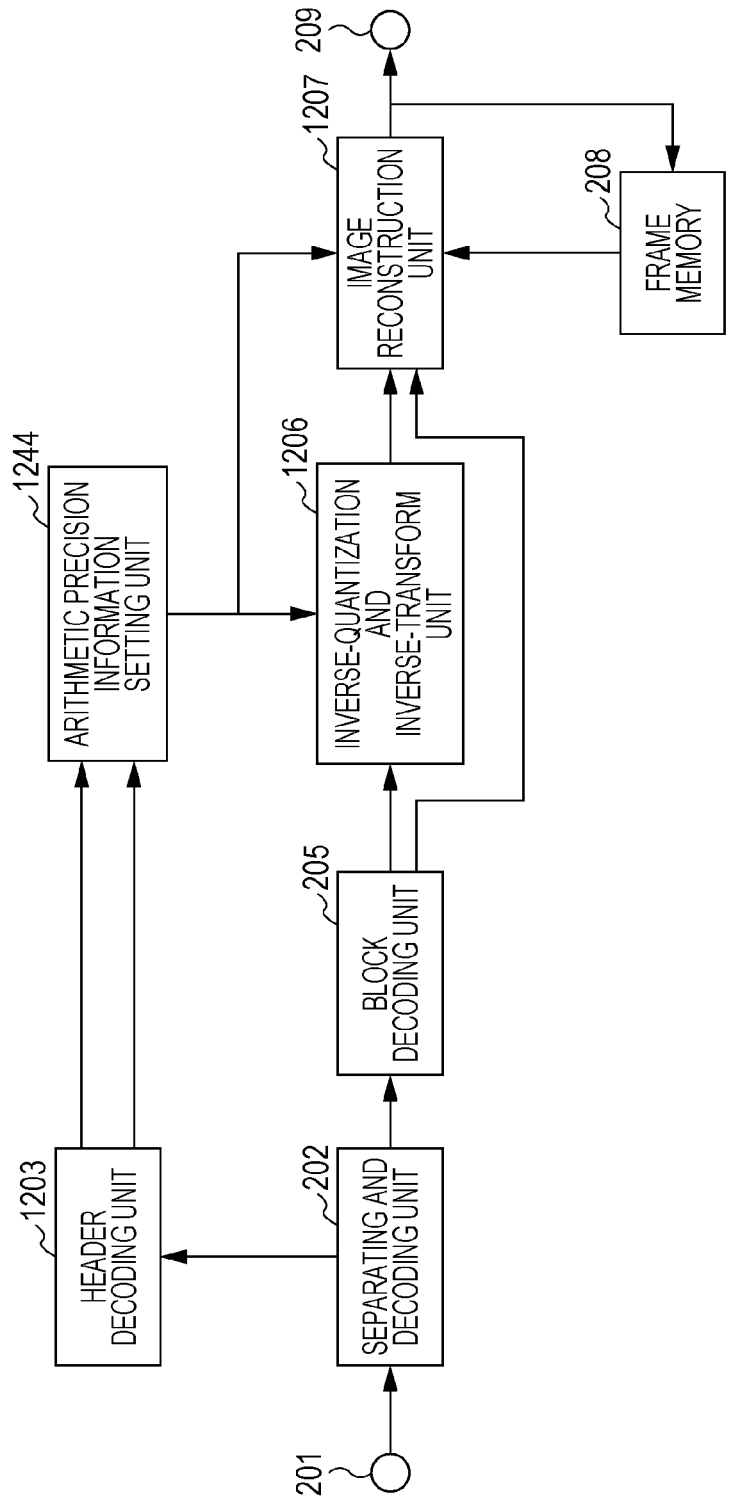

[Fig. 13]
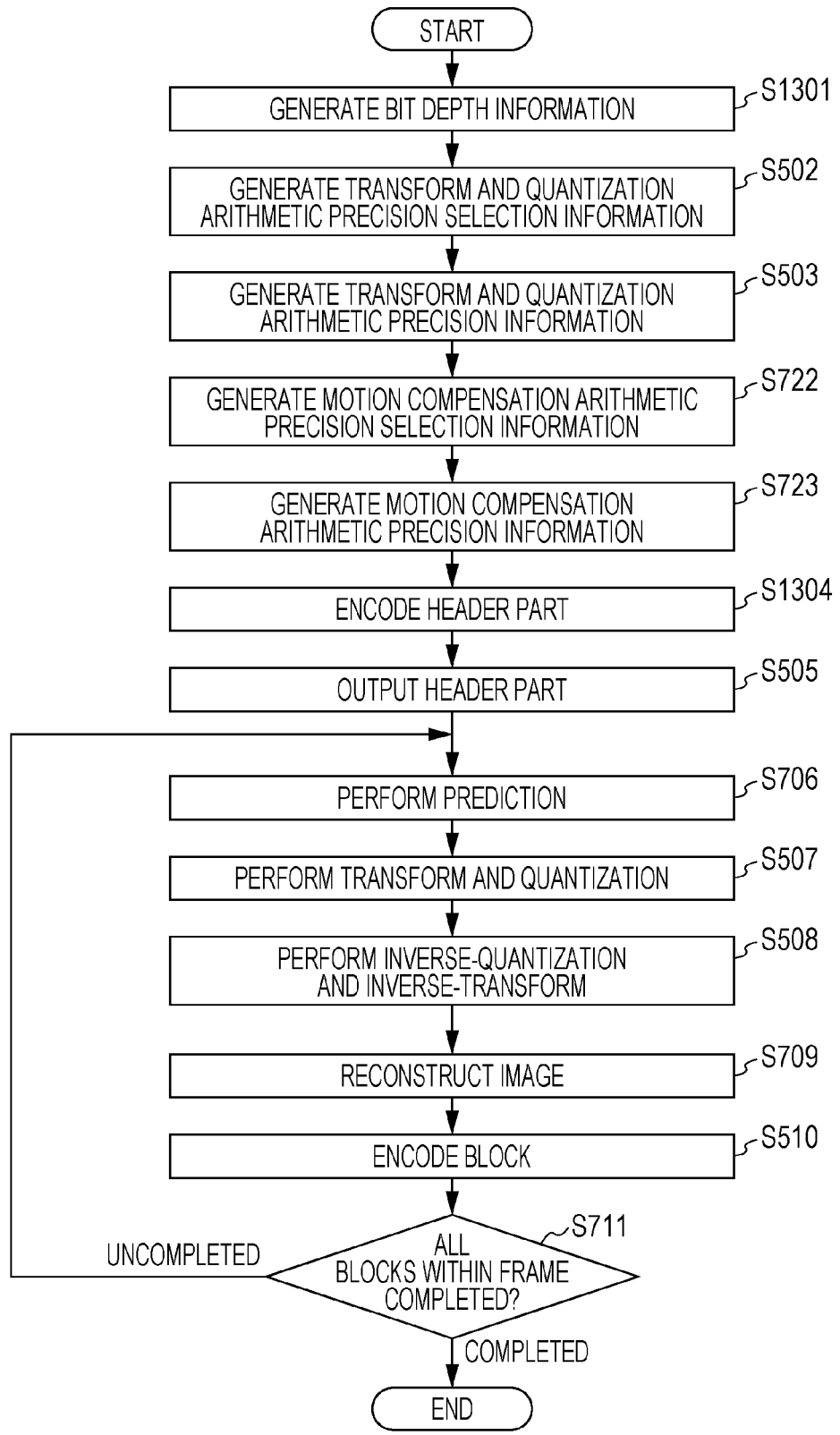

[Fig. 14]
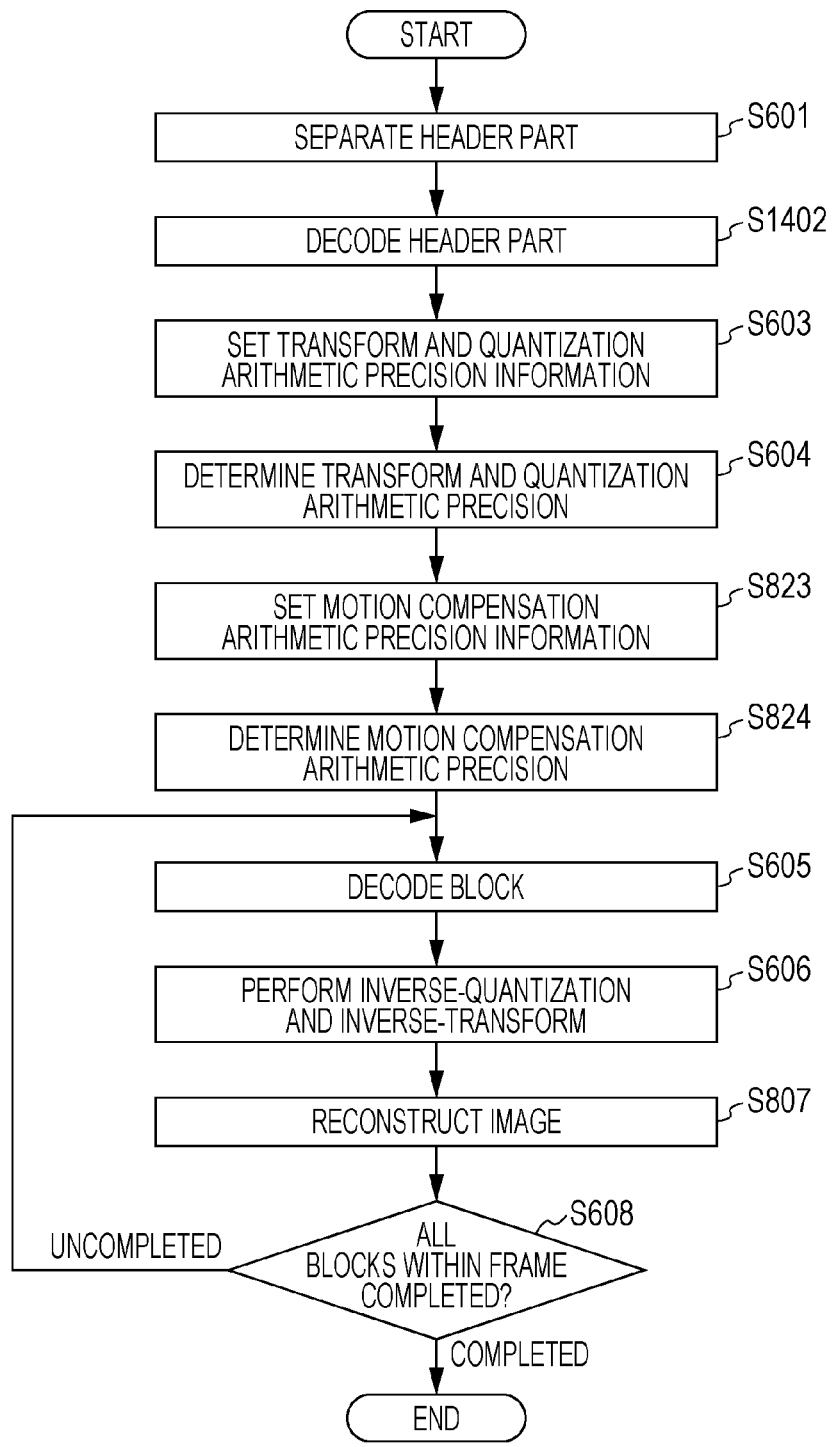

[Fig. 15]
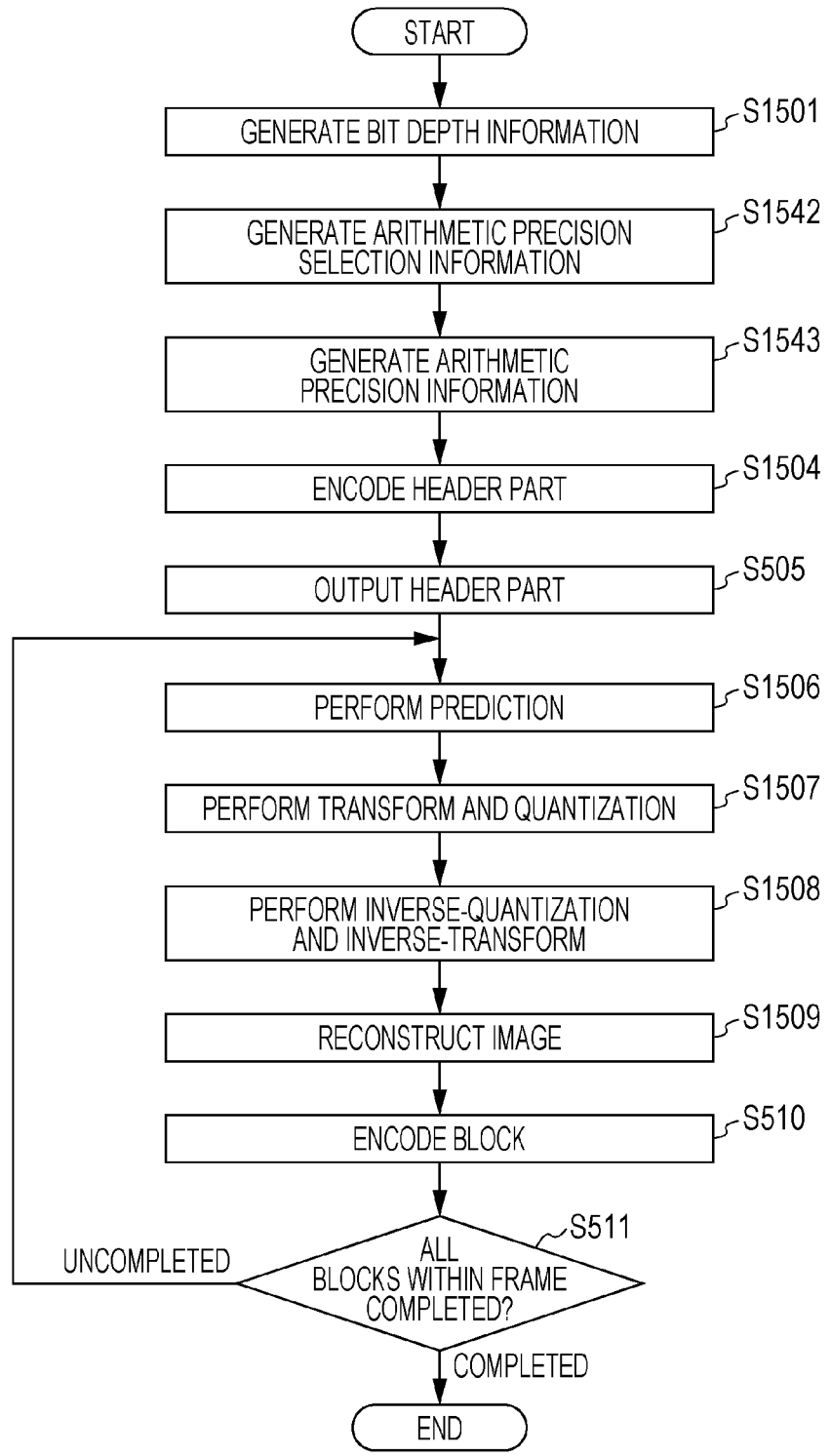

[Fig. 16]
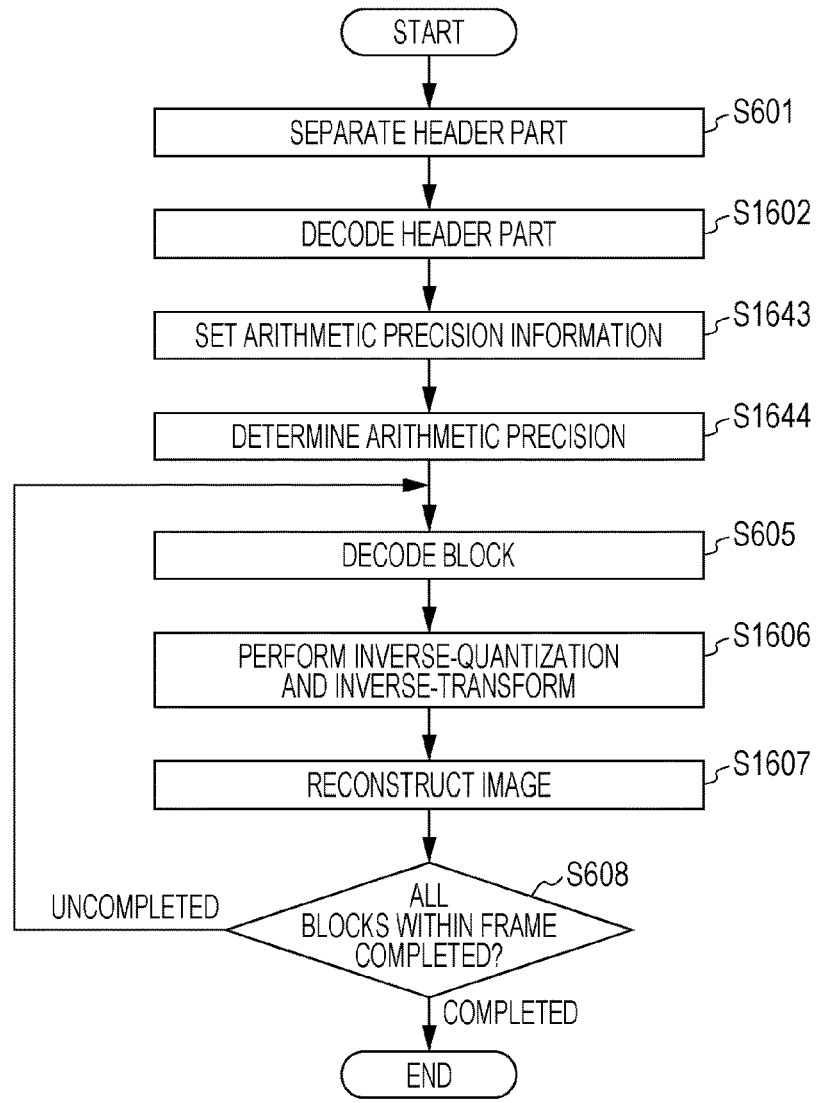
[Fig. 17A]
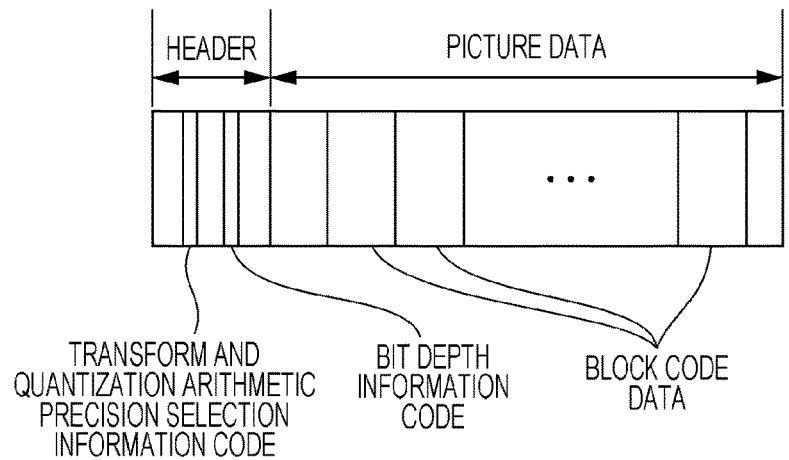

[Fig. 17B]
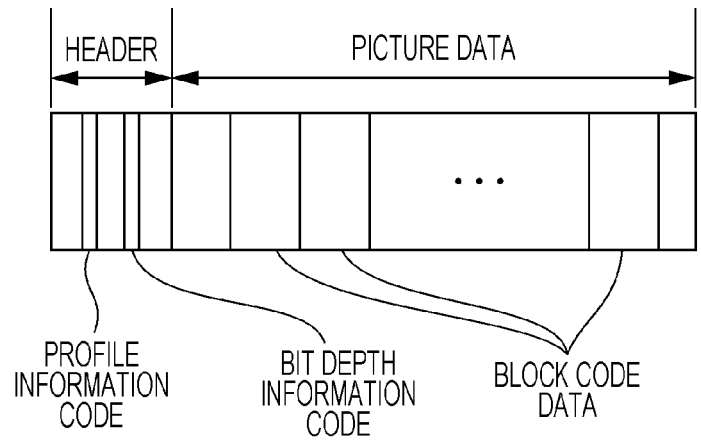
[Fig. 18A]
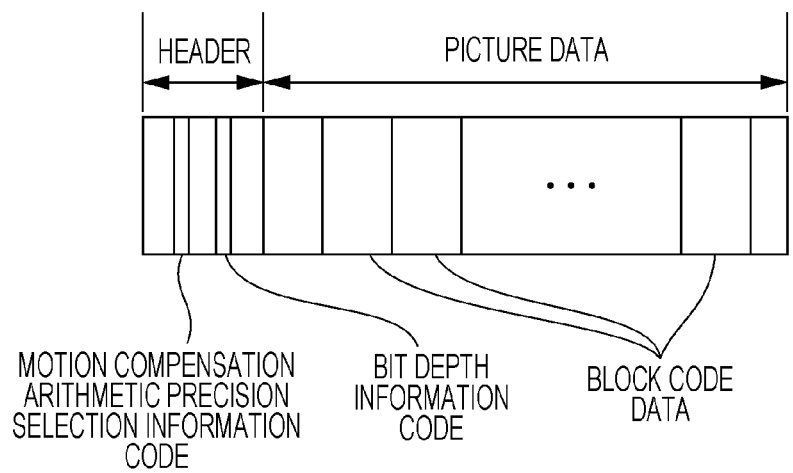
[Fig. 18B]
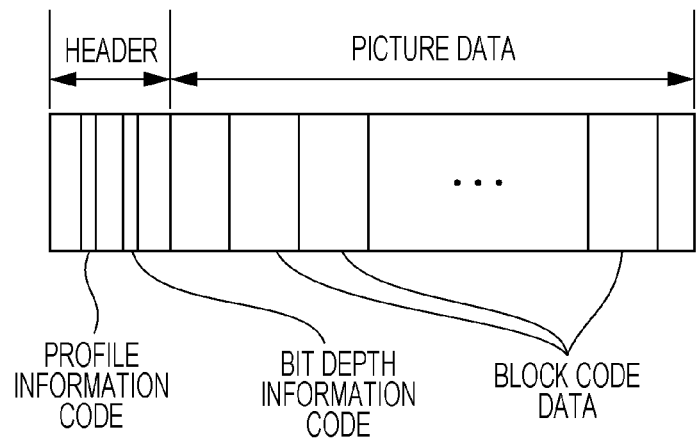

[Fig. 19A]
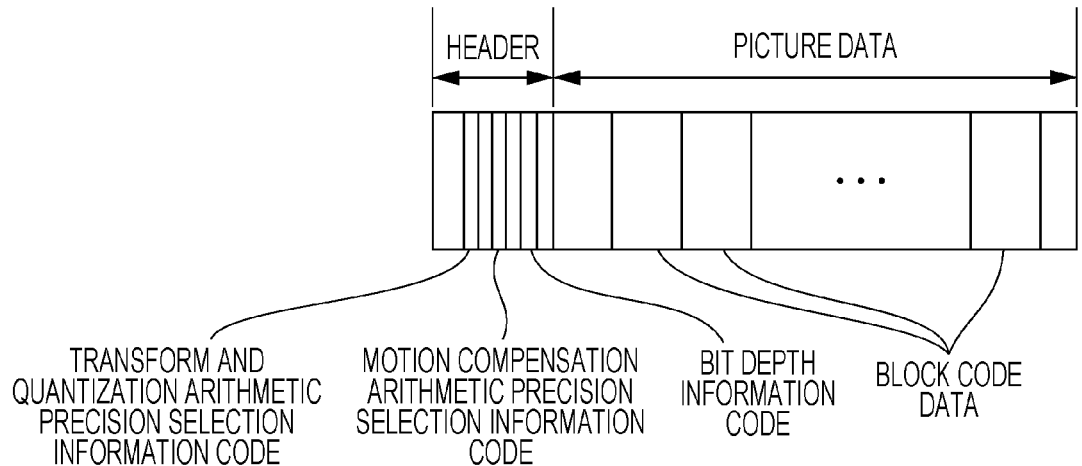
[Fig. 19B]
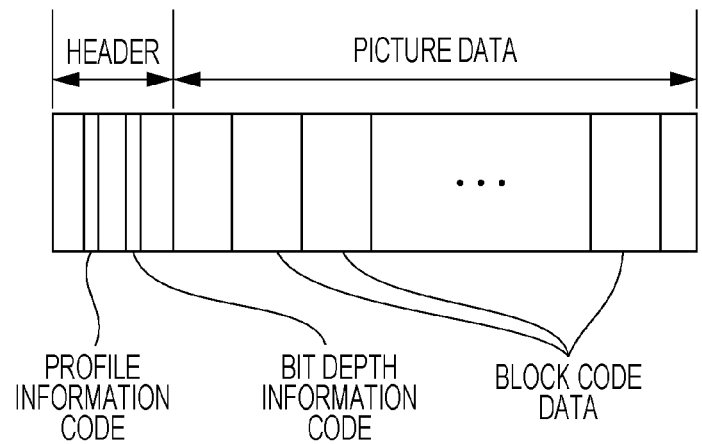
[Fig. 19C]
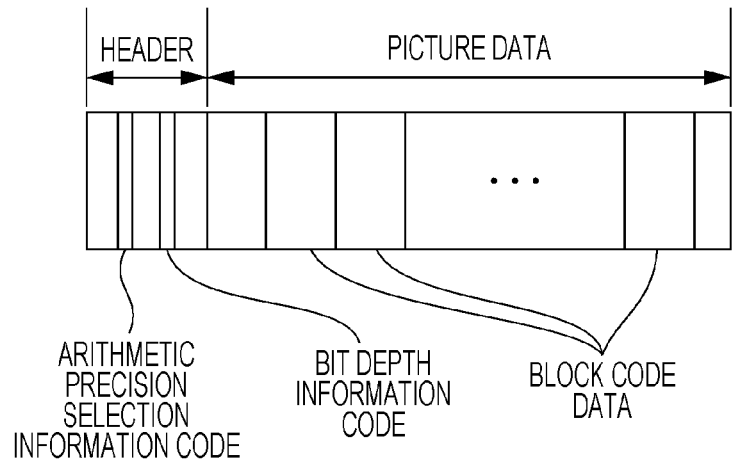

[Fig. 20]
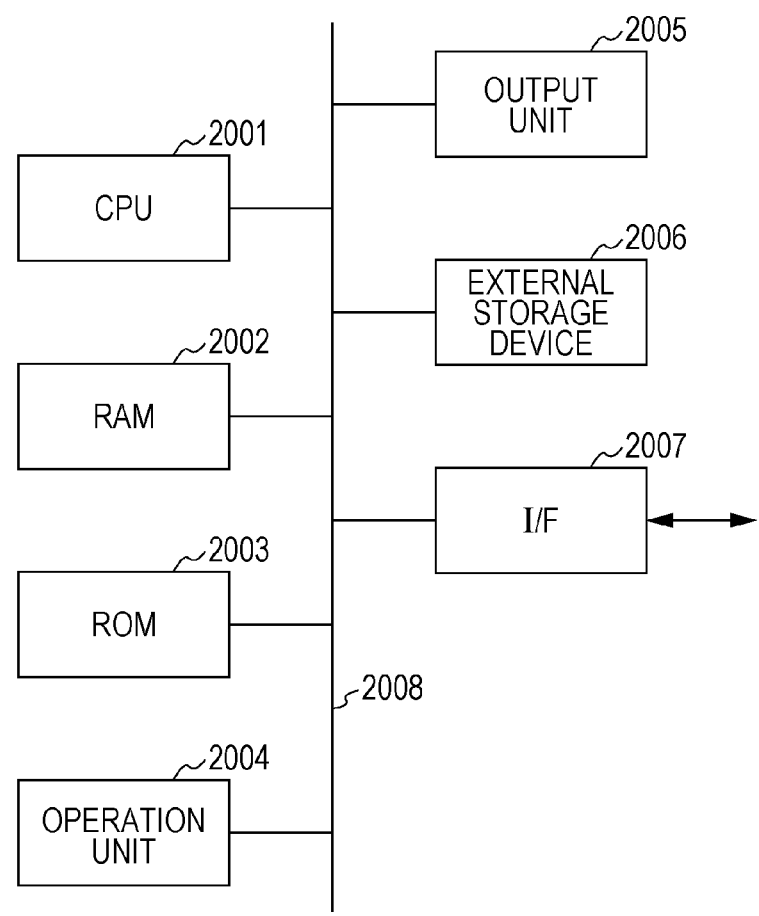

[Fig. 21]

| TRANSFORM AND QUANTIZATION ARITHMETIC PRECISION INFORMATION | 0 | 1 | 2 | 3 | 4 |
|---|---|---|---|---|---|
| RANGE THAT MAY BE TAKEN AS EACH ARITHMETIC RESULT IN TRANSFORM AND QUANTIZATION PROCESSING | −32768 TO 32767 | −65536 TO 65535 | −131072 TO 131071 | −262144 TO 262143 | −524288 TO 524287 |

| TRANSFORM AND QUANTIZATION ARITHMETIC PRECISION INFORMATION | 5 | 6 | 7 | 8 | ... |
|---|---|---|---|---|---|
| RANGE THAT MAY BE TAKEN AS EACH ARITHMETIC RESULT IN TRANSFORM AND QUANTIZATION PROCESSING | −1048576 TO 1048575 | −2097152 TO 2097151 | −4194304 TO 4194303 | −8388608 TO 8388607 | ... TO ... |

ENCODING INCLUDING TRANSFORM AND QUANTIZATION, OR DECODING INCLUDING INVERSE-TRANSFORM AND INVERSE-QUANTIZATION

TECHNICAL FIELD

The present invention relates to an image encoding device, an image encoding method and program, an image decoding device, and an image decoding method and program.

BACKGROUND ART

As an encoding scheme for compression recording of moving images, H.264/MPEG-4 AVC (hereinafter, referred to as H.264) is known (NPL 1: ITU-T H.264 (June 2011) Advanced video coding for generic audiovisual services). In H.264, a plurality of profiles that define limits in encoding technology are defined. For example, High 10 profile corresponds to an image of a bit depth ranging from 8 bits to 10 bits.

In recent years, activities to achieve international standardization of an encoding scheme with higher efficiency as a successor of the H.264 have been launched. Between the International Organization for Standardization (ISO)/the International Electrotechnical Commission (IEC) and the International Telecommunication Union Telecommunication Standardization Sector (ITU-T), Joint Collaborative Team on Video Coding (JCT-VC) has been established. In the JCT-VC, standardization of a high efficiency video coding (HEVC) encoding scheme (hereinafter, abbreviated as HEVC) is underway.

A Main 10 profile, which corresponds to an image of a bit depth ranging from 8 bits to 10 bits, is defined also in HEVC (NPL2: JCT-VC contributions JCTVC-K1003_v10.doc Internet <http://phenix.int-evry.fr/jct/doc_end_user/documents/11_Shanghai/wg11/>).

In HEVC, in processing of orthogonal transform, motion compensation, or the like, by reducing the arithmetic precision in accordance with the bit depth of an image, an emphasis is placed on the easiness of implementation. For example, expression (1) provided below is one of calculation expressions used for motion compensation processing on a decimal pixel, in motion compensation for chrominance signals.

[Math.1]

$$ab_{0,0} = (-2 \times B_{-1,0} + 58 \times B_{0,0} + 10 \times B_{1,0} - 2 \times B_{2,0}) \gg \text{shift1} \quad (1)$$

It should be noted that in expression (1), "shift1" represents the chrominance bit depth minus 8 and ">>" represents bit shift to the right.

In expression (1), "$B_{i,j}$" represents intermediate values for calculating a chrominance pixel at an integer pixel position and "$ab_{0,0}$" represents a chrominance pixel at a decimal pixel position, respectively. Expression (1) includes bit shift processing to the right by "shift1" which is always dependent on the bit depth. Therefore, the range of a value which the intermediate value "$ab_{0,0}$" may take is constant, regardless of the bit depth of an image. Since such arithmetic processing is introduced, it is considered that in HEVC, implementation cost of the hardware does not increase so much even when an image of higher bit depth is supported. On the contrary, through an arithmetic operation typified by the bit shift processing described above, arithmetic precision is reduced in the case of images of high bit depth. Therefore, there is a problem that the image quality does not improve.

CITATION LIST

Non Patent Literature

NPL 1: ITU-T H.264 (June 2011) Advanced video coding for generic audiovisual services NPL 2: JCT-VC contributions JCTVC-K1003_v10.doc Internet <http://phenix.int-evry.fr/jct/doc_end_user/documents/11_Shanghai/wg11/>

SUMMARY OF INVENTION

The present invention has been made to solve the problems described above. The present invention achieves encoding and decoding which support both an encoding process which is not dependent on the bit depth of images and which maintains a certain precision even in the case of a high bit depth and an encoding process which is dependent on the bit depth of images and which places an emphasis on the easiness of implementation by reducing the arithmetic precision in the case of a high bit depth.

Accordingly, an image encoding device according to an aspect of the present invention includes a prediction unit configured to perform prediction for a received image for each block on the basis of encoded pixels to generate prediction errors; a transform and quantization unit configured to perform orthogonal transform and quantization on the prediction errors to generate quantization coefficients; a coefficient encoding unit configured to encode the quantization coefficients; an arithmetic precision information generating unit configured to generate arithmetic precision selection information representing selection of arithmetic precision of at least one of the prediction, the orthogonal transform, and the quantization; and an arithmetic precision encoding unit configured to encode the arithmetic precision selection information.

According to another aspect of the present invention, an image decoding device includes a coefficient decoding unit configured to decode quantization coefficients encoded from a received bit stream to reconstruct quantization coefficients; an inverse-quantization and inverse-transform unit configured to perform inverse-quantization and perform inverse-orthogonal transform on the quantization coefficients to reconstruct prediction errors; an image reconstruction unit configured to perform prediction based on decoded pixels, generate a prediction image, and reconstruct an image decoded on the basis of the prediction image and the prediction errors; and an arithmetic precision information decoding unit configured to decode arithmetic precision selection information representing selection of arithmetic precision of at least one of the inverse-quantization, the inverse-orthogonal transform, and the prediction, from the bit stream.

Further features of the present invention will become apparent from the following description of exemplary embodiments with reference to the attached drawings.

BRIEF DESCRIPTION OF DRAWINGS

FIG. 1 is a block diagram illustrating a configuration of an image encoding device according to a first embodiment.

FIG. 2 is a block diagram illustrating a configuration of an image decoding device according to a second embodiment.

FIG. 3 is a block diagram illustrating a configuration of an image encoding device according to a third embodiment.

FIG. 4 is a block diagram illustrating a configuration of an image decoding device according to a fourth embodiment.

FIG. 5 is a flowchart illustrating an image encoding process performed by the image encoding device according to the first embodiment.

FIG. 6 is a flowchart illustrating an image decoding process performed by the image decoding device according to the second embodiment.

FIG. 7 is a flowchart illustrating an image encoding process performed by the image encoding device according to the third embodiment.

FIG. 8 is a flowchart illustrating an image decoding process performed by the image decoding device according to the fourth embodiment.

FIG. 9 is a block diagram illustrating a configuration of an image encoding device according to a fifth embodiment.

FIG. 10 is a block diagram illustrating a configuration of an image decoding device according to a sixth embodiment.

FIG. 11 is a block diagram illustrating another configuration of the image encoding device according to the fifth embodiment.

FIG. 12 is a block diagram illustrating another configuration of the image decoding device according to the sixth embodiment.

FIG. 13 is a flowchart illustrating an image encoding process performed by the image encoding device according to the fifth embodiment.

FIG. 14 is a flowchart illustrating an image decoding process performed by the image decoding device according to the sixth embodiment.

FIG. 15 is another flowchart illustrating the image encoding process performed by the image encoding device according to the fifth embodiment.

FIG. 16 is another flowchart illustrating the image decoding process performed by the image decoding device according to the sixth embodiment.

FIG. 17A is a diagram illustrating an example of a configuration of a bit stream generated in the first embodiment and is decoded in the second embodiment.

FIG. 17B is a diagram illustrating an example of a configuration of a bit stream generated in the first embodiment and is decoded in the second embodiment.

FIG. 18A is a diagram illustrating an example of a configuration of a bit stream generated in the third embodiment and is decoded in the fourth embodiment.

FIG. 18B is a diagram illustrating an example of a configuration of a bit stream generated in the third embodiment and is decoded in the fourth embodiment.

FIG. 19A is a diagram illustrating an example of a configuration of a bit stream generated in the fifth embodiment and is decoded in the sixth embodiment.

FIG. 19B is a diagram illustrating an example of a configuration of a bit stream generated in the fifth embodiment and is decoded in the sixth embodiment.

FIG. 19C is a diagram illustrating an example of a configuration of a bit stream generated in the fifth embodiment and is decoded in the sixth embodiment.

FIG. 20 is a block diagram illustrating an example of a hardware configuration of a computer that is applicable to an image encoding device and decoding device according to an embodiment of the present invention.

FIG. 21 is a diagram illustrating the relationship between range information, the bit depth of an image, and the range that may be taken as a quantization coefficient in the first and second embodiments.

DESCRIPTION OF EMBODIMENTS

Hereinafter, with reference to the attached drawings, the invention of this application will be described in detail based on embodiments. Configurations illustrated in the following embodiments are merely examples, and the present invention is not limited to the illustrated configurations.

First Embodiment

Hereinafter, embodiments of the present invention will be described with reference to the drawings. FIG. 1 is a block diagram illustrating an image encoding device according to a first embodiment. In FIG. 1, a terminal 101 receives image data.

An input unit 102 analyzes the bit depth of the image data input thereto, and divides the image data into square block units. A transform and quantization arithmetic precision information generating unit 103 generates transform and quantization arithmetic precision selection information, which will be described later. At the same time, the transform and quantization arithmetic precision information generating unit 103 generates transform and quantization arithmetic precision information representing arithmetic precisions of transform and quantization processing performed in a transform and quantization unit 106 and inverse-quantization and inverse-transform processing performed in an inverse-quantization and inverse-transform unit 107. A header encoding unit 104 encodes information necessary for decoding a bit stream, such as bit depth information of an image, to generate header code data.

A prediction unit 105 performs intra-prediction, which is intra-frame prediction, inter-prediction, which is inter-frame prediction, or the like, by referring to a frame memory 109 in units of divided square blocks, and generates prediction information representing a prediction method and a prediction error. The transform and quantization unit 106 calculates a transform coefficient by performing, for each block, orthogonal transform on the prediction error generated by the prediction unit 105, and calculates a quantization coefficient by performing quantization on the transform coefficient. The inverse-quantization and inverse-transform unit 107 reconstructs a transform coefficient by performing inverse-quantization on the quantization coefficient generated by the transform and quantization unit 106, and reconstructs a prediction error by performing inverse-orthogonal transform.

An image reconstruction unit 108 performs intra-prediction, inter-prediction, or the like by referring to the frame memory 109 on the basis of the prediction information generated by the prediction unit 105, and generates a reconstruction image on the basis of the prediction error generated by the inverse-quantization and inverse-transform unit 107. The frame memory 109 stores images reconstructed by the image reconstruction unit 108. A block encoding unit 110 generates block code data by encoding the prediction information generated by the prediction unit 105 and the quantization coefficient generated by the transform and quantization unit 106. An integration encoding unit 111 forms a bit stream on the basis of the generated header code data and block code data, and outputs the formed bit stream. A terminal 112 outputs the bit stream generated by the integration encoding unit 111 to the outside.

An image encoding operation performed in the above-described image encoding device will now be described below. In the first embodiment, the image encoding device is configured to receive moving image data in units of frames. However, the image encoding device may be configured to receive still image data for one frame.

Image data for one frame received via the terminal 101 is input to the input unit 102. In the first embodiment, image data of 10 bit depth is input to the image encoding device. However, the bit depth of input image data is not limited to this. The input unit 102 analyzes the bit depth of the received image data, and outputs bit depth information to the transform and quantization arithmetic precision information generating unit 103 and the header encoding unit 104. However, the bit depth information may be separately supplied from the outside and input to the transform and quantization arithmetic precision information generating unit 103 and the header encoding unit 104. Furthermore, the received image data is divided in units of square blocks and is output to the prediction unit 105.

The transform and quantization arithmetic precision information generating unit 103 determines whether transform and quantization processing which gives priority to the easiness of implementation by adjusting the arithmetic precision in accordance with the bit depth or transform and quantization processing which maintains a constant arithmetic precision regardless of the bit depth is to be performed, and sets information representing the determination result as transform and quantization arithmetic precision selection information. Hereinafter, the former transform and quantization processing in which the arithmetic precision is adjusted according to the bit depth will be referred to as implementation-oriented transform and quantization processing, and the latter transform and quantization processing in which the arithmetic precision is maintained constant will be referred to as precision-oriented transform and quantization processing. In the first embodiment, the transform and quantization arithmetic precision selection information is set to "0" when the former implementation-oriented transform and quantization processing is selected, and the transform and quantization arithmetic precision selection information is set to "1" when the latter precision-oriented transform quantization processing is selected. However, the combination of the selected transform and quantization processing and the transform and quantization arithmetic precision selection information is not limited to this. Furthermore, the method for determining the transform and quantization arithmetic precision selection information is not particularly limited. The transform and quantization arithmetic precision selection information may be determined prior to encoding processing with anticipation of an application in which the encoding device and a corresponding decoding device are to be used. Alternatively, the transform and quantization arithmetic precision selection information may be selected by a user, which is not illustrated. For example, in the case where it is assumed that the encoding device according to the first embodiment is used in an application in which an emphasis is placed on arithmetic precision, the transform and quantization arithmetic precision selection information is set to "1". Meanwhile, for example, in the case where it is assumed that the encoding device is not used in such an application, the transform and quantization arithmetic precision selection information is set to "0".

Next, the transform and quantization arithmetic precision information generating unit 103 generates transform and quantization arithmetic precision information on the basis of the above-mentioned transform and quantization arithmetic precision selection information and the bit depth information received from the input unit 102. When the transform and quantization arithmetic precision selection information represents "1", a difference value between the bit depth of an image and a reference bit depth, which is 8 bit depth, is used as transform and quantization arithmetic precision information. In the first embodiment, since the bit depth of an image is 10 bit depth, the transform and quantization arithmetic precision information is set to "2". Furthermore, when the transform and quantization arithmetic precision selection information represents "0", "0" is set as transform and quantization arithmetic precision information. However, the combination of the value and meaning of the transform and quantization arithmetic precision information is not limited to the example mentioned above. Any combination is possible as long as the transform and quantization arithmetic precision information can represent that the arithmetic precision of transform and quantization processing is increased when the bit depth of an image is greater than the reference bit depth.

The generated transform and quantization arithmetic precision selection information is output to the header encoding unit 104, and the generated transform and quantization arithmetic precision information is output to the transform and quantization unit 106 and the inverse-quantization and inverse-transform unit 107.

The header encoding unit 104 encodes information necessary for decoding, such as the bit depth information received from the input unit 102 and the transform and quantization arithmetic precision selection information received from the transform and quantization arithmetic precision information generating unit 103 to generate header code data. The header code data corresponds to a header part of a bit stream. The generated header code data is output to the integration encoding unit 111.

The image data divided in units of blocks by the input unit 102 is input to the prediction unit 105. The prediction unit 105 performs prediction in units of blocks by appropriately referring to encoded pixels stored in the frame memory 109, and generates a prediction image. A prediction error is generated as a difference between an input image and a prediction image for each block, and the generated prediction error is input to the transform and quantization unit 106. Furthermore, the prediction unit 105 generates information necessary for prediction, such as a motion vector, a prediction mode, and the like, as prediction information, and outputs the generated prediction information to the image reconstruction unit 108 and the block encoding unit 110.

The transform and quantization unit 106 first receives the transform and quantization arithmetic precision information from the transform and quantization arithmetic precision information generating unit 103, and determines the arithmetic precision in transform and quantization processing. In the first embodiment, based on a table illustrated in FIG. 21, a range that may be taken as each arithmetic result of one-dimensional orthogonal transform in each of horizontal and vertical directions and quantization processing is determined as an arithmetic precision. However, the combination of the transform and quantization arithmetic precision information and the range that may be taken as each arithmetic result is not limited to the example mentioned above. In the first embodiment, since transform and quantization arithmetic precision information having a value of "0" or "2" is input, each arithmetic result ranges from −32768 to 32767 or from −131072 to 131071. Although processing for the case where each arithmetic result exceeds the above-mentioned range is not particularly limited, the result may be adjusted within the above-mentioned range by performing clipping processing or bit shift processing.

Next, based on the arithmetic precision determined as described above, the transform and quantization unit 106 performs orthogonal transform on the prediction error received from the prediction unit 105 to generate a transform coefficient. Furthermore, the transform and quantization unit 106 performs quantization on the transform coefficient to generate a quantization coefficient. Then, the transform and quantization unit 106 outputs the generated quantization coefficient to the inverse-quantization and inverse-transform unit 107 and the block encoding unit 110.

Similar to the transform and quantization unit 106, the inverse-quantization and inverse-transform unit 107 first receives the transform and quantization arithmetic precision information from the transform and quantization arithmetic precision information generating unit 103, and determines the arithmetic precision in inverse-quantization and inverse-transform processing. In the first embodiment, similar to the transform and quantization unit 106, based on the table illustrated in FIG. 21, the inverse-quantization and inverse-transform unit 107 determines a range that may be taken as each arithmetic result of inverse-quantization processing and one-dimensional orthogonal transform processing in each of the vertical and horizontal directions as an arithmetic precision.

Next, the inverse-quantization and inverse-transform unit 107 reconstructs a transform coefficient by performing inverse-quantization on the quantization coefficient received from the transform and quantization unit 106, on the basis of the arithmetic precision determined as described above, and reconstructs a prediction error by performing inverse-orthogonal transform on the reconstructed transform coefficient. Then, the inverse-quantization and inverse-transform unit 107 outputs the reconstructed prediction error to the image reconstruction unit 108.

The image reconstruction unit 108 generates a prediction image by appropriately referring to the frame memory 109, on the basis of the prediction information received from the prediction unit 105, and generates a reconstruction image based on the generated prediction image and the prediction error received from the inverse-quantization and inverse-transform unit 107. Then, the image reconstruction unit 108 outputs the generated reconstruction image to the frame memory 109, and the reconstruction image is stored into the frame memory 109.

The block encoding unit 110 entropy-encodes, in units of blocks, the quantization coefficient received from the transform and quantization unit 106 and the prediction information received from the prediction unit 105 to generate block code data. Although the method of entropy encoding is not particularly specified, Golomb coding, arithmetic coding, Huffman coding, or the like may be used. Then, the block encoding unit 110 outputs the generated block code data to the integration encoding unit 111.

The integration encoding unit 111 forms a bit stream by multiplexing the header code data, which has been generated prior to encoding processing in units of blocks and received from the header encoding unit 104, and the block code data received from the block encoding unit 110. Finally, the bit stream formed by the integration encoding unit 111 is output via the terminal 112 to the outside.

FIG. 17A illustrates an example of a bit stream generated in the first embodiment. Transform and quantization arithmetic precision selection information is arranged as a transform and quantization arithmetic precision selection information code within a header of either one of a sequence, a picture, and the like. Similarly, bit depth information is also arranged as a bit depth information code within a header of either one of a sequence, a picture, and the like.

However, the bit stream is not necessarily configured as described above. As illustrated in FIG. 17B, instead of encoding a transform and quantization arithmetic precision selection information code, a corresponding profile may be determined and the determined profile may be encoded as a profile information code. For example, it is assumed that a Main 10-bit profile and a Main 10-bit high-precision profile exist and that transform and quantization arithmetic precision selection information of the Main 10-bit profile and transform and quantization arithmetic precision selection information of the Main 10-bit high-precision profile are set to "0" and "1", respectively. That is, a range that may be taken as each arithmetic result of transform and quantization processing is constant regardless of the bit depth of an image in the case of the Main 10-bit profile, whereas a range that may be taken as each arithmetic result of transform and quantization processing differs depending on the bit depth of an image in the case of the Main 10-bit high-precision profile. In such a case, when the transform and quantization arithmetic precision selection information represents "0", a code representing a Main 10-bit profile may be encoded as a profile information code. In contrast, when the transform and quantization arithmetic precision selection information represents "1", a code representing a Main 10-bit high-precision profile may be encoded as a profile information code.

FIG. 5 is a flowchart illustrating an image encoding process performed by the image encoding device according to the first embodiment.

In step S501, the input unit 102 analyzes the bit depth of received image data to generate bit depth information. In step S502, the transform and quantization arithmetic precision information generating unit 103 generates transform and quantization arithmetic precision selection information for selecting transform and quantization arithmetic precision information representing arithmetic precision in transform and quantization processing. In step S503, the transform and quantization arithmetic precision information generating unit 103 generates transform and quantization arithmetic precision information based on the transform and quantization arithmetic precision selection information generated in step S502 and the bit depth information generated in step S501. In step S504, the header encoding unit 104 generates header code data by encoding information necessary for decoding, such as the bit depth information generated in step S501 and the transform and quantization arithmetic precision selection information generated in step S502.

In step S505, the integration encoding unit 111 forms a header part of a bit stream on the basis of the header code data generated in step S504, and outputs the header part. In step S506, the input unit 102 separates square blocks from the received image data, and the prediction unit 105 performs prediction of image data for each separated block to generate a prediction image. As a difference between received image data and a prediction image for each block, a prediction error is generated. Furthermore, information necessary for prediction, such as a motion vector, a prediction mode, and the like, is generated as prediction information.

In step S507, the transform and quantization unit 106 first determines arithmetic precision in transform and quantization processing on the basis of the transform and quantization arithmetic precision information generated in step S503. Then, on the basis of the determined arithmetic precision, the transform and quantization unit 106 generates a transform coefficient by performing orthogonal transform on the prediction error generated in step S506, and generates a quantization coefficient by performing quantization on the generated transform coefficient. Similar to step S507, in step S508, the inverse-quantization and inverse-transform unit 107 first determines arithmetic precision in inverse-quantization and inverse-transform processing on the basis of the transform and quantization arithmetic precision information generated in step S503. Then, the inverse-quantization and inverse-transform unit 107 reconstructs a transform coefficient by performing inverse-quantization on the quantization coefficient generated in step S507 on the basis of the determined arithmetic precision, and reconstructs a prediction error by performing inverse-orthogonal transform on the reconstructed transform coefficient.

In step S509, the image reconstruction unit 108 generates a prediction image by appropriately referring to the frame memory 109 on the basis of the prediction information generated in step S506. Then, the image reconstruction unit 108 generates a reconstruction image based on the generated prediction image and the prediction error reconstructed in step S508, and the generated reconstruction image is stored into the frame memory 109. In step S510, the block encoding unit 110 encodes the prediction information generated in step S506 and the quantization coefficient generated in step S507 to generate block code data. Furthermore, the integration encoding unit 111 generates a bit stream, including different code data. In step S511, the image encoding device determines whether or not encoding of all the blocks within a frame has been completed. If encoding of all the blocks within a frame has been completed, the encoding process is terminated. In contrast, if encoding of all the blocks within a frame has not been completed, the process returns to step S506 to perform processing for the next block.

With the configuration and operation described above, in particular, by encoding the transform and quantization arithmetic precision selection information in step S504, a bit stream for which switching between encoding processes having different arithmetic precisions or different implementation costs can be performed according to the specifications required for an application, can be generated.

In the above description for the first embodiment, the encoding process is performed in the order of steps S508, S509, and S510. However, the encoding process is not necessarily performed in this order as long as step S510 is not performed earlier than step S507.

Furthermore, in the first embodiment, only the transform and quantization processing in steps S507 and S508 is changed on the basis of the transform and quantization arithmetic precision selection information. However, the encoding processing in step S510 may also be changed in accordance with a change in the range of a quantization coefficient. In such a case, transform and quantization arithmetic precision selection information or transform and quantization arithmetic precision information is also input to the block encoding unit 110. In this case, since an optimal entropy encoding method can be selected in accordance with the range of a quantization coefficient, encoding with higher efficiency can be achieved.

In the case where image data to be encoded has 8-bit depth, a transform and quantization arithmetic precision selection information code may be omitted. That is, in the case of 8-bit depth, since transform and quantization arithmetic precision information is uniquely set to "0", a redundant code can be eliminated.

Furthermore, in the first embodiment, a range that may be taken as each arithmetic result of one-dimensional orthogonal transform in each of the horizontal and vertical directions and quantization processing is determined as arithmetic precision. However, the arithmetic precision is not necessarily determined as described above. For example, the transform and quantization unit 106 may calculate arithmetic precision within a range from $-2^{(15+aq)}$ to $2^{(15+aq)}-1$, where "aq" represents transform and quantization arithmetic precision information.

Furthermore, the transform and quantization arithmetic precision selection information of the above-mentioned Main 10-bit profile is always set to "0". However, in the case of the above-mentioned Main 10-bit high-precision profile, a transform and quantization arithmetic precision selection information code may be provided so that the transform and quantization arithmetic precision selection information may be selected between "0" and "1". With this configuration, selection of arithmetic precision can be performed even for a high-precision profile.

In the first embodiment, in step S508 illustrated in FIG. 5, arithmetic precision in the inverse-quantization and inverse-transform processing is determined on the basis of the transform and quantization arithmetic precision information generated in step S503. However, the arithmetic precision may be determined on the basis of the arithmetic precision calculated in step S507.

Furthermore, in the above description, the bit stream generated in the first embodiment is encoded in the order of a transform and quantization arithmetic precision selection information code and a bit depth information code, as illustrated in FIG. 17A. However, the encoding is not necessarily performed in this order.

Second Embodiment

FIG. 2 is a block diagram illustrating a configuration of an image decoding device according to a second embodiment. In the second embodiment, decoding of the bit stream generated in the first embodiment will be explained by way of example.

A terminal 201 receives a bit stream. A separating and decoding unit 202 separates header code data, which is information on decoding processing, and block code data, which is information of each block, including a quantization coefficient and prediction information, from the bit stream, and outputs the separated header code data and block code data to the subsequent units. A header decoding unit 203 decodes the header code data to reconstruct information on decoding processing. A transform and quantization arithmetic precision information setting unit 204 generates transform and quantization arithmetic precision information representing arithmetic precision in inverse-quantization and inverse-transform processing used by an inverse-quantization and inverse-transform unit 206. A block decoding unit 205 decodes the block code data to reconstruct a quantization coefficient and prediction information.

The inverse-quantization and inverse-transform unit 206 reconstructs a transform coefficient by performing inverse-quantization on the quantization coefficient reconstructed by the block decoding unit 205, and reconstructs a prediction error by performing inverse-orthogonal transform. An image reconstruction unit 207 performs intra-prediction, inter-prediction, or the like by referring to a frame memory 208 on the basis of the prediction information reconstructed by the block decoding unit 205, and generates reconstruction image data on the basis of the prediction error generated by the inverse-quantization and inverse-transform unit 206. The frame memory 208 stores image data reconstructed by the image reconstruction unit 207. A terminal 209 outputs the reconstructed image data to the outside.

An image decoding operation performed by the above-described image decoding device will now be described below. In the second embodiment, the bit stream generated in the first embodiment is decoded.

Referring to FIG. 2, a bit stream received via the terminal 201 is input to the separating and decoding unit 202. In the second embodiment, the bit stream illustrated in FIG. 17A is input to the image decoding device. The separating and decoding unit 202 separates header code data, which is information on decoding processing, and block code data, which is information of each block, from the received bit stream, and outputs the separated header code data and block code data to the subsequent units. The header code data is output to the header decoding unit 203, and the block code data is output to the block decoding unit 205. The header decoding unit 203 decodes information necessary for decoding from the header code data received from the separating and decoding unit 202, and reconstructs transform and quantization arithmetic precision selection information and bit depth information. The header decoding unit 203 outputs the reconstructed transform and quantization arithmetic precision selection information and bit depth information to the transform and quantization arithmetic precision information setting unit 204.

The transform and quantization arithmetic precision information setting unit 204 generates transform and quantization arithmetic precision information on the basis of the transform and quantization arithmetic precision selection information and the bit depth information received from the header decoding unit 203. In the second embodiment, similar to the transform and quantization arithmetic precision information generating unit 103 in the first embodiment, in the case where the transform and quantization arithmetic precision selection information represents "1", a difference value between the bit depth information and a reference bit depth, which is 8-bit depth, is used as transform and quantization arithmetic precision information. Since the bit stream generated in the first embodiment is obtained by encoding a 10-bit image, the bit depth information in the second embodiment also represents 10-bit depth. Thus, the transform and quantization arithmetic precision information is set to "2". In contrast, in the case where the transform and quantization arithmetic precision selection information represents "0", "0" is set as transform and quantization arithmetic precision information. However, similar to the first embodiment, the combination of transform and quantization arithmetic precision selection information and transform and quantization arithmetic precision information is not limited to the example provided above. The generated transform and quantization arithmetic precision information is output to the inverse-quantization and inverse-transform unit 206.

Meanwhile, the block decoding unit 205 decodes the block code data received from the separating and decoding unit 202 to reconstruct a quantization coefficient and prediction information. The block decoding unit 205 outputs the reconstructed quantization coefficient and prediction information to the inverse-quantization and inverse-transform unit 206 and the image reconstruction unit 207, respectively. Similar to the inverse-quantization and inverse-transform unit 107 in the first embodiment, the inverse-quantization and inverse-transform unit 206 first determines arithmetic precision in inverse-quantization and inverse-transform processing on the basis of the transform and quantization arithmetic precision information received from the transform and quantization arithmetic precision information setting unit 204. In the second embodiment, similar to the inverse-quantization and inverse-transform unit 107 in the first embodiment, the inverse-quantization and inverse-transform unit 206 determines a range that may be taken by arithmetic processing, such as inverse-quantization processing and one-dimensional orthogonal transform processing in each of the vertical and horizontal directions, as arithmetic precision on the basis of the table illustrated in FIG. 21.

Furthermore, the inverse-quantization and inverse-transform unit 206 reconstructs a transform coefficient by performing inverse-quantization on the quantization coefficient received from the block decoding unit 205, on the basis of the arithmetic precision determined as described above, and reconstructs a prediction error by performing inverse-orthogonal transform on the reconstructed transform coefficient. The inverse-quantization and inverse-transform unit 206 outputs the reconstructed prediction error to the image reconstruction unit 207.

The image reconstruction unit 207 generates a prediction image by appropriately referring to the frame memory 208 on the basis of the prediction information received from the block decoding unit 205, and generates a reconstruction image on the basis of the generated prediction image and the prediction error received from the inverse-quantization and inverse-transform unit 206. The image reconstruction unit 207 outputs the reconstructed image data to the frame memory 208, and the image data is stored into the frame memory 208. The reconstructed image data is also output via the terminal 209 to the outside.

FIG. 6 is a flowchart illustrating an image decoding process performed by the image decoding device according to the second embodiment.

In step S601, the separating and decoding unit 202 separates header code data, which is information on decoding processing, from a received bit stream. In step S602, the header decoding unit 203 decodes information necessary for decoding from the header code data separated in step S601, and reconstructs transform and quantization arithmetic precision selection information and bit depth information. In step S603, the transform and quantization arithmetic precision information setting unit 204 generates transform and quantization arithmetic precision information on the basis of the transform and quantization arithmetic precision selection information and the bit depth information reconstructed in step S602. In step S604, the inverse-quantization and inverse-transform unit 206 determines arithmetic precision in inverse-quantization and inverse-transform processing on the basis of the transform and quantization arithmetic precision information generated in step S603. In step S605, the block decoding unit 205 decodes block code data, which is separated as code data of each block from the bit stream by the separating and decoding unit 202, and reconstructs a quantization coefficient and prediction information.

In step S606, the inverse-quantization and inverse-transform unit 206 reconstructs a transform coefficient by performing inverse-quantization on the quantization coefficient generated in step S605, on the basis of the arithmetic precision determined in step S604, and reconstructs a prediction error by performing inverse-orthogonal transform on the reconstructed transform coefficient. In step S607, the image reconstruction unit 207 generates a prediction image by appropriately referring to the frame memory 208 on the basis of the prediction information reconstructed in step S605. Then, the image reconstruction unit 207 generates a reconstruction image on the basis of the generated prediction image and the prediction error reconstructed in step S606, and the reconstruction image is stored into the frame memory 208. The reconstructed image data is also output via the terminal 209 to the outside. In step S608, the image decoding device determines whether or not decoding of all the blocks within a frame has been completed. If decoding of all the blocks within a frame has been completed, the decoding process is terminated. In contrast, if decoding of all the blocks within a frame has not been completed, the process returns to step S605 to perform processing for the next block.

With the configuration and operation described above, in particular, by decoding the transform and quantization arithmetic precision selection information in step S602, the bit stream for which decoding processes having different arithmetic precisions or different implementation costs can be performed according to the specifications required for the application generated in the first embodiment, can be decoded.

In the above description for the second embodiment, the bit stream input to the image decoding device is obtained by individually encoding the transform and quantization arithmetic precision selection information illustrated in FIG. 17A. However, the received bit stream is not necessarily configured as described above. For example, as illustrated in FIG. 17B, instead of encoding the transform and quantization arithmetic precision selection information, a profile information code representing a corresponding profile may be encoded. In this case, the transform and quantization arithmetic precision information setting unit 204 generates transform and quantization arithmetic precision information on the basis of the profile information code and bit depth information.

Furthermore, in the above description for the second embodiment, only the inverse-quantization and inverse-transform processing in step S606 is changed on the basis of the transform and quantization arithmetic precision selection information. However, the decoding processing in step S605 may also be changed in accordance with a change in the range of a quantization coefficient. In such a case, the transform and quantization arithmetic precision selection information or the transform and quantization arithmetic precision information is input also to the block decoding unit 205. Therefore, the decoding processing performed by the block decoding unit 205 needs to correspond to the encoding processing performed by the block encoding unit 110 in the first embodiment. In this case, since an optimal entropy decoding method can be selected in accordance with the range of a quantization coefficient, decoding of an encoded bit stream can be performed more efficiently.

Third Embodiment

FIG. 3 is a block diagram illustrating an image encoding device according to a third embodiment. In FIG. 3, units having functions similar to those in the first embodiment illustrated in FIG. 1 will be referred to with the same reference numerals and explanation for those similar units will be omitted.

A motion compensation arithmetic precision information generating unit 323 generates motion compensation arithmetic precision selection information, which will be described below. The motion compensation arithmetic precision information generating unit 323 also generates motion compensation arithmetic precision information representing arithmetic precision of motion compensation processing used by a prediction unit 305. A header encoding unit 304 generates header code data by encoding information necessary for decoding a bit stream, such as bit depth information of an image. The header encoding unit 304 is different from the header encoding unit 104 in the first embodiment in encoding the motion compensation arithmetic precision selection information, which will be described later, instead of transform and quantization arithmetic precision selection information.

The prediction unit 305 performs intra-prediction, which is intra-frame prediction, inter-prediction, which is inter-frame prediction, or the like by referring to the frame memory 109 in units of divided square blocks, and generates prediction information, which represents a prediction method, and a prediction error. The prediction unit 305 is different from the prediction unit 105 in the first embodiment in receiving motion compensation arithmetic precision information and performing inter-prediction on the basis of the received motion compensation arithmetic precision information.

A transform and quantization unit 306 calculates a transform coefficient by performing, for each block, orthogonal transform on the prediction error generated by the prediction unit 305, and calculates a quantization coefficient by performing quantization on the transform coefficient. The transform and quantization unit 306 is different from the transform and quantization unit 106 in the first embodiment in performing transform and quantization processing at a constant arithmetic precision without receiving transform and quantization arithmetic precision information.

An inverse-quantization and inverse-transform unit 307 reconstructs a transform coefficient by performing inverse-quantization on the quantization coefficient generated by the transform and quantization unit 306, and reconstructs a prediction error by performing inverse-orthogonal transform. The inverse-quantization and inverse-transform unit 307 is different from the inverse-quantization and inverse-transform unit 107 in the first embodiment in performing inverse-quantization and inverse-transform processing at a constant arithmetic precision without receiving transform and quantization arithmetic precision information.

An image reconstruction unit 308 performs intra-prediction, inter-prediction, or the like by referring to the frame memory 109 on the basis of the prediction information generated by the prediction unit 306, and generates a reconstruction image on the basis of the prediction error generated by the inverse-quantization and inverse-transform unit 307. The image reconstruction unit 308 is different from the image reconstruction unit 108 in the first embodiment in receiving motion compensation arithmetic precision information and performing inter-prediction on the basis of the received motion compensation arithmetic precision information.

An image encoding operation performed by the above-described image encoding device will now be described below.

The input unit 102 analyzes the bit depth of the received image data, and outputs bit depth information to the motion compensation arithmetic precision information generating unit 323 and the header encoding unit 304. However, the bit depth information may be separately supplied from the outside and input to the motion compensation arithmetic precision information generating unit 323 and the header encoding unit 304. Furthermore, the received image data is divided in units of square blocks and is output to the prediction unit 305.

The motion compensation arithmetic precision information generating unit 323 determines whether motion compensation processing which gives priority to the easiness of implementation by adjusting the arithmetic precision according to the bit depth or motion compensation processing which maintains a constant arithmetic precision regardless of the bit depth is to be performed, and sets information representing the determination result as motion compensation arithmetic precision selection information. Hereinafter, the former motion compensation processing in which the arithmetic precision is adjusted according to the bit depth will be referred to as implementation-oriented motion compensation processing, and the latter motion compensation processing in which the arithmetic precision is maintained constant will be referred to as precision-oriented motion compensation processing. In the third embodiment, in the case where the implementation-oriented motion compensation processing is selected, the motion compensation arithmetic precision selection information is set to "0". Meanwhile, in the case where the precision-oriented motion compensation processing is selected, the motion compensation arithmetic precision selection information is set to "1". However, the combination of the selected motion compensation processing and the motion compensation arithmetic precision selection information is not limited to the example mentioned above. Furthermore, the method for determining the motion compensation arithmetic precision selection information is not particularly limited. The motion compensation arithmetic precision selection information may be determined prior to encoding processing with anticipation of an application in which the encoding device and a corresponding decoding device are to be used. Alternatively, the motion compensation arithmetic precision selection information may be selected by a user which is not illustrated. For example, in the case where it is assumed that the encoding device according to the third embodiment is used in an application in which an emphasis is placed on arithmetic precision, the motion compensation arithmetic precision selection information is set to "1". Meanwhile, for example, in the case where it is assumed that the encoding device is not used in such an application, the motion compensation arithmetic precision selection information is set to "0".

Next, the motion compensation arithmetic precision information generating unit 323 generates motion compensation arithmetic precision information on the basis of the motion compensation arithmetic precision selection information described above and the bit depth information received from the input unit 102. When the motion compensation arithmetic precision selection information represents "0", a difference value between the bit depth of an image and a reference bit depth, which is 8-bit depth, is used as motion compensation arithmetic precision information. In the third embodiment, since the bit depth of an image is 10-bit depth, the motion compensation arithmetic precision information is set to "2". Meanwhile, when the motion compensation arithmetic precision selection information represents "1", the motion compensation arithmetic precision information is set to "0". However, the combination of the value and meaning of the motion compensation arithmetic precision information is not limited to the example mentioned above. Any combination is possible as long as the motion compensation arithmetic precision information can represent that arithmetic precision of motion compensation processing is increased when the bit depth of an image is greater than the reference bit depth.

The generated motion compensation arithmetic precision selection information is output to the header encoding unit 304, and the generated motion compensation arithmetic precision information is output to the prediction unit 305 and the image reconstruction unit 308.

The header encoding unit 304 encodes information necessary for decoding, such as the bit depth information received from the input unit 102 and the motion compensation arithmetic precision selection information received from the motion compensation arithmetic precision information generating unit 323, and generates header code data. The generated header code data corresponds to a header part of a bit stream. The header encoding unit 304 outputs the generated header code data to the integration encoding unit 111.

Meanwhile, the prediction unit 305 receives image data which is divided in units of blocks by the input unit 102 and the motion compensation arithmetic precision information generated by the motion compensation arithmetic precision information generating unit 323. Then, the prediction unit 305 performs prediction in units of blocks, and generates prediction information representing a method of prediction, such as intra-prediction, which is intra-frame prediction, inter-frame prediction, which is inter-frame prediction, or the like. The method for generating prediction information is not particularly limited. The method for generating prediction information may be determined on the basis of the similarity between an encoded pixel stored in the frame memory 109 and a pixel within a block to be encoded. Alternatively, the method for generating prediction information may be determined on the basis of statistical information of an image. The prediction unit 305 outputs the prediction method to the image reconstruction unit 308 and the block encoding unit 110. Then, a prediction image is generated by appropriately referring to an encoded pixel stored in the frame memory 109 on the basis of the generated prediction information. In generation of a prediction image, in the case where a block to be encoded has been subjected to inter-prediction encoding, motion compensation processing based on motion compensation arithmetic precision information is performed. More specifically, in the third embodiment, one of calculation expressions used for motion compensation processing on a decimal pixel, in motion compensation for chrominance signals, represented by expression (1), is represented by expression (2):

[Math.2]

$$ab_{0,0} = (-2 \times B_{-1,0} + 58 \times B_{0,0} + 10 \times B_{1,0} - 2 \times B_{2,0}) \gg \text{shift} \quad (2)$$

It should be noted that in expression (2), "shift" represents motion compensation arithmetic precision information, and ">>" represents bit shift to the right.

In expression (2), similar to expression (1), "$B_{i,j}$" and "$ab_{0,0}$" represent intermediate values for calculating a chrominance pixel at an integer pixel position and a chrominance pixel at a decimal pixel position, respectively. In expression (2), bit shift processing to the right by "shift" is based on motion compensation arithmetic precision information. Therefore, in the case where the implementation-oriented motion compensation processing is selected by the motion compensation arithmetic precision information generating unit 323, since bit shift processing to the right that is dependent on the bit depth is included in expression (2), a value that may be taken as the intermediate value "$ab_{0,0}$" is constant regardless of the bit depth of an image. In contrast, in the case where the precision-oriented motion compensation is selected by the motion compensation arithmetic precision information generating unit 323, the value of "shift" in expression (2) is always maintained at 0, and bit shift processing to the right is not performed. Therefore, processing maintaining an arithmetic precision can be performed.

Finally, the prediction unit 305 generates a prediction error as a difference between a received image for each block and a generated prediction image, and outputs the generated prediction error to the transform and quantization unit 306.

The transform and quantization unit 306 generates a transform coefficient by performing orthogonal transform on the prediction error received from the prediction unit 305, and generates a quantization coefficient by performing quantization on the transform coefficient. The transform and quantization unit 306 outputs the generated quantization coefficient to the inverse-quantization and inverse-transform unit 307 and the block encoding unit 110.

The inverse-quantization and inverse-transform unit 307 reconstructs a transform coefficient by performing inverse-quantization on the quantization coefficient received from the transform and quantization unit 306, and reconstructs a prediction error by performing inverse-orthogonal transform on the reconstructed transform coefficient. The inverse-quantization and inverse-transform unit 307 outputs the reconstructed prediction error to the image reconstruction unit 308.

The image reconstruction unit 308 generates a prediction image by appropriately referring to the frame memory 109 on the basis of the prediction information received from the prediction unit 305 and the motion compensation arithmetic precision information received from the motion compensation arithmetic precision information generating unit 323. In generation of a prediction image, in the case where a block to be encoded has been subjected to inter-prediction encoding, motion compensation processing based on motion compensation arithmetic precision information is performed. More specifically, similar to the prediction unit 305, the image reconstruction unit 308 performs motion compensation processing typified by expression (2).

Then, the image reconstruction unit 308 generates a reconstruction image on the basis of the generated prediction image and the prediction error received from the inverse-quantization and inverse-transform unit 307. The image reconstruction unit 308 outputs the generated reconstruction image to the frame memory 109, and the reconstruction image is stored into the frame memory 109.

FIG. 18A illustrates an example of a bit stream generated in the third embodiment. Motion compensation arithmetic precision selection information is arranged as a motion compensation arithmetic precision selection information code within a header of either one of a sequence, a picture, and the like. Similarly, bit depth information is also arranged as a bit depth information code within a header of either one of a sequence, a picture, and the like.

However, the bit stream is not necessarily configured as described above. As illustrated in FIG. 18B, instead of encoding a motion compensation arithmetic precision selection information code, a corresponding profile may be determined and the determined profile may be encoded as a profile information code. For example, it is assumed that a Main 10-bit profile and a Main 10-bit high-precision profile exist and motion compensation arithmetic precision selection information of the Main 10-bit profile and motion compensation arithmetic precision selection information of the Main 10-bit high-precision profile represent "0" and "1", respectively. That is, the implementation-oriented motion compensation processing is selected for the Main 10-bit profile, and the precision-oriented motion compensation processing is selected for the Main 10-bit high-precision profile. In this case, when the motion compensation arithmetic precision selection information represents "0", a code representing the Main 10-bit profile may be encoded as a profile information code. Meanwhile, when the motion compensation arithmetic precision selection information represents "1", a code representing the Main 10-bit high-precision profile may be encoded as a profile information code.

FIG. 7 is a flowchart illustrating an encoding process performed by the image encoding device according to the third embodiment. Steps having functions similar to those in the first embodiment illustrated in FIG. 5 will be referred to with the same reference numerals and explanation for those similar steps will be omitted.

In step S722, the motion compensation arithmetic precision information generating unit 323 generates motion compensation arithmetic precision selection information for selecting motion compensation arithmetic precision information representing arithmetic precision in motion compensation processing. In the third embodiment, the motion compensation arithmetic precision selection information is set to "0" when the implementation-oriented motion compensation processing is selected, and the motion compensation arithmetic precision selection information is set to "1" when the precision-oriented motion compensation processing is selected.

In step S723, the motion compensation arithmetic precision information generating unit 323 generates motion compensation arithmetic precision information on the basis of the motion compensation arithmetic precision selection information generated in step S722 and the bit depth information generated in step S501. In step S704, the header encoding unit 304 encodes information necessary for decoding, such as the bit depth information generated in step S501 and the motion compensation arithmetic precision selection information generated in step S502 to generate header code data.

In step S706, the input unit 102 separates square blocks from the received image data, and the prediction unit 305 performs prediction, in units of blocks, for the image data of each separated block. Furthermore, the prediction unit 305 generates prediction information representing a method of prediction, such as intra-prediction, which is intra-frame prediction, inter-prediction, such as inter-frame prediction, or the like. Then, the prediction unit 305 generates a prediction image by appropriately referring to an encoded pixel stored in the frame memory 109 on the basis of the generated prediction information. In generation of a prediction image, in the case where a block to be encoded has been subjected to inter-prediction encoding, motion compensation processing based on the motion compensation arithmetic precision information generated in step S723 is performed. More specifically, motion compensation processing typified by expression (2) is performed. The prediction unit 305 also generates a prediction error as a difference between received image data and a prediction image for each block.

In step S707, the transform and quantization unit 306 generates a transform coefficient by performing orthogonal transform on the prediction error generated in step S706, and generates a quantization coefficient by performing quantization on the generated transform coefficient. In step S708, the inverse-quantization and inverse-transform unit 307 reconstructs a transform coefficient by performing inverse-quantization on the quantization coefficient generated in step S707, and reconstructs a prediction error by performing inverse-orthogonal transform on the reconstructed transform coefficient.

In step S709, the image reconstruction unit 308 generates a prediction image by appropriately referring to the frame memory 109 on the basis of the prediction information generated in step S706. In generation of a prediction image, in the case where a block to be encoded has been subjected to inter-prediction encoding, motion compensation processing based on the motion compensation arithmetic precision information generated in step S723 is performed. More specifically, similar to step S706, motion compensation processing typified by expression (2) is performed. Then, the image reconstruction unit 308 generates a reconstruction image on the basis of the generated prediction image and the prediction error reconstructed in step S708, and the generated reconstruction image is stored into the frame memory 109. In step S711, the image encoding device determines whether or not encoding of all the blocks within a frame has been completed. If encoding of all the blocks within a frame has been completed, the encoding process is terminated. In contrast, if encoding of all the blocks within a frame has not been completed, the process returns to step S706 to perform encoding of the next block.

With the configuration and operation described above, in particular, by encoding the motion compensation arithmetic precision selection information in step S704, a bit stream for which switching between encoding processes having different arithmetic precisions or different implementation costs can be performed according to the specifications required for an application, can be generated.

In the above description for the third embodiment, the encoding process is performed in the order of steps S708, S709, and S510. However, the encoding process is not necessarily performed in this order as long as step S510 is not performed earlier than step S707.

Furthermore, in the case where image data to be encoded has 8-bit depth, a motion compensation arithmetic precision selection information code may be omitted. That is, in the case where image data to be encoded has 8-bit depth, since motion compensation arithmetic precision information is uniquely set to "0", a redundant code can be eliminated.

Furthermore, the motion compensation arithmetic precision selection information of the Main 10-bit profile is always set to "0". However, for the Main 10-bit high-precision profile, a motion compensation arithmetic precision selection information code may be provided so that the motion compensation arithmetic precision selection information can be selected between "0" and "1". With this configuration, selection of arithmetic precision can be performed even for a high-precision profile.

Furthermore, in the above description, the bit stream generated in the third embodiment is encoded in the order of a motion compensation arithmetic precision selection information code and a bit depth information code, as illustrated in FIG. 18A. However, the encoding is not necessarily performed in this order.

Fourth Embodiment

FIG. 4 is a block diagram illustrating an image decoding device according to a fourth embodiment. In FIG. 4, units having functions similar to those in the second embodiment illustrated in FIG. 2 will be referred to with the same reference numerals and explanation for those similar units will be omitted. In the fourth embodiment, decoding of the bit stream generated in the third embodiment will be explained by way of example.

A header decoding unit 403 decodes header code data, which has been separated from a bit stream, to reconstruct information on decoding processing. A motion compensation arithmetic precision information setting unit 424 generates motion compensation arithmetic precision information representing arithmetic precision in motion compensation processing to be used by an image reconstruction unit 407. An inverse-quantization and inverse-transform unit 406 reconstructs a transform coefficient by performing inverse-quantization on a quantization coefficient reconstructed by the block decoding unit 205, and reconstructs a prediction error by performing inverse-orthogonal transform. The inverse-quantization and inverse-transform unit 406 is different from the inverse-quantization and inverse-transform unit 206 in the second embodiment in performing inverse-quantization and inverse-transform processing at a constant arithmetic precision without receiving transform and quantization arithmetic precision information.

The image reconstruction unit 407 performs intra-prediction, inter-prediction, or the like by referring to the frame memory 208 on the basis of prediction information reconstructed by the block decoding unit 205, and generates a reconstruction image on the basis of a prediction error generated by the inverse-quantization and inverse-transform unit 406. The image reconstruction unit 407 is different from the image reconstruction unit 207 in the second embodiment in receiving motion compensation arithmetic precision information and performing inter-prediction on the basis of the received motion compensation arithmetic precision information.

An image decoding operation performed by the image decoding device will now be described below. In the fourth embodiment, the bit stream generated in the third embodiment is decoded.

The header decoding unit 403 decodes information necessary for decoding from header code data received from the separating and decoding unit 202 to reconstruct motion compensation arithmetic precision selection information and bit depth information. The header decoding unit 403 outputs the reconstructed motion compensation arithmetic precision selection information and bit depth information to the motion compensation arithmetic precision information setting unit 424.

The motion compensation arithmetic precision information setting unit 424 generates motion compensation arithmetic precision information on the basis of the motion compensation arithmetic precision selection information and the bit depth information received from the header decoding unit 403. In the fourth embodiment, similar to the motion compensation arithmetic precision information generating unit 323 in the third embodiment, a difference value between the bit depth information and the reference bit depth, which is 8-bit depth, is used as motion compensation arithmetic precision information when the motion compensation arithmetic precision selection information represents "0". Since the bit stream generated in the third embodiment is obtained by encoding a 10-bit image, the bit depth information in the fourth embodiment also represents 10-bit depth. Therefore, the motion compensation arithmetic precision information is set to "2". In contrast, when the motion compensation arithmetic precision selection information represents "1", "0" is set as the motion compensation arithmetic precision information. However, as in the third embodiment, the combination of the motion compensation arithmetic precision selection information and the motion compensation arithmetic precision information is not limited to the example mentioned above. The motion compensation arithmetic precision information setting unit 424 outputs the generated motion compensation arithmetic precision information to the image reconstruction unit 407.

The inverse-quantization and inverse-transform unit 406 reconstructs a transform coefficient by performing inverse-quantization on the quantization coefficient received from the block decoding unit 205, and reconstructs a prediction error by performing inverse-orthogonal transform on the reconstructed transform coefficient. The inverse-quantization and inverse-transform unit 406 outputs the reconstructed prediction error to the image reconstruction unit 407.

The image reconstruction unit 407 generates a prediction image by appropriately referring to the frame memory 208 on the basis of the prediction information received from the block decoding unit 205 and the motion compensation arithmetic precision information received from the motion compensation arithmetic precision information setting unit 424. In generation of a prediction image, in the case where a block to be decoded has been subjected to inter-prediction encoding, motion compensation processing based on the motion compensation arithmetic precision information is performed. More specifically, motion compensation processing typified by expression (2) is performed. The image reconstruction unit 407 generates a reconstruction image on the basis of the generated prediction image and the prediction error received from the inverse-quantization and inverse-transform unit 406. The image reconstruction unit 407 outputs the generated reconstruction image to the frame memory 208, and the reconstruction image is stored into the frame memory 208.

FIG. 8 is a flowchart illustrating a decoding process performed by the image decoding device according to the fourth embodiment. Steps having functions similar to those in the second embodiment illustrated in FIG. 6 will be referred to with the same reference numerals and explanation for those similar steps will be omitted.

In step S802, the header decoding unit 403 decodes information necessary for decoding from the header code data separated in step S601 to generate motion compensation arithmetic precision selection information and bit depth information. In step S823, the motion compensation arithmetic precision information setting unit 424 generates motion compensation arithmetic precision information on the basis of the motion compensation arithmetic precision selection information and the bit depth information that have been reconstructed in step S802. In step S824, the image reconstruction unit 407 determines arithmetic precision in the subsequent motion compensation processing on the basis of the motion compensation arithmetic precision information generated in step S823. In step S806, the inverse-quantization and inverse-transform unit 406 reconstructs a transform coefficient by performing inverse-quantization on the quantization coefficient generated in step S605, and reconstructs a prediction error by performing inverse-orthogonal transform on the reconstructed transform coefficient.

In step S807, the image reconstruction unit 407 generates a prediction image by appropriately referring to the frame memory 208 on the basis of the prediction information reconstructed in step S605. In generation of a prediction image, in the case where a block to be decoded has been subjected to inter-prediction encoding, motion compensation processing based on the motion compensation information determined in step S824 is performed. More specifically, motion compensation processing typified by expression (2) is performed. Then, the image reconstruction unit 407 generates reconstruction image data on the basis of the generated prediction image and the prediction image reconstructed in step S806, and the generated reconstruction image data is stored into the frame memory 208. The reconstruction image data is also output via the terminal 209.

With the configuration and operation described above, in particular, by decoding the motion compensation arithmetic precision selection information in step S802, a bit stream for which decoding processes having different arithmetic precisions or different implementation costs can be performed according to the specifications required for the application generated in the third embodiment, can be decoded.

In the above description for the fourth embodiment, the bit stream input to the image decoding device is obtained by independently encoding the motion compensation arithmetic precision selection information illustrated in FIG. 18A. However, the bit stream is not necessarily configured as described above. For example, as illustrated in FIG. 18B, instead of encoding a motion compensation arithmetic precision selection information code, a profile information code representing a corresponding profile may be encoded. In this case, the motion compensation arithmetic precision information setting unit 424 generates motion compensation arithmetic precision information on the basis of the profile information code and the bit depth information.

Fifth Embodiment

FIG. 9 is a block diagram illustrating an image encoding device according to a fifth embodiment. In FIG. 9, units having functions similar to those in the first embodiment illustrated in FIG. 1 and the third embodiment illustrated in FIG. 3 will be referred to with the same reference numerals and explanation for those similar units will be omitted.

An input unit 902 analyzes the bit depth of received image data and divides the image data into square blocks. The input unit 902 is different from the input unit 102 in the first embodiment in outputting the bit depth information also to the motion compensation arithmetic precision information generating unit 323. A header encoding unit 904 encodes information necessary for decoding a bit stream, such as bit depth information of an image, to generate header code data.

An image encoding operation performed by the image encoding device will now be described below.

The input unit 902 analyzes the bit depth of received image data, and outputs bit depth information to the motion compensation arithmetic precision information generating unit 323, the transform and quantization arithmetic precision information generating unit 103, and the header encoding unit 904. However, the bit depth information may be separately supplied from the outside and input to the motion compensation arithmetic precision information generating unit 323, the transform and quantization arithmetic precision information generating unit 103, and the header encoding unit 904. Furthermore, the input unit 902 divides the received image data into square blocks, and outputs the divided square blocks to the prediction unit 305.

The header encoding unit 904 first receives bit depth information from the input unit 902, receives motion compensation arithmetic precision selection information from the motion compensation arithmetic precision information generating unit 323, and receives transform and quantization arithmetic precision selection information from the transform and quantization arithmetic precision selection information generating unit 103. Then, the header encoding unit 904 generates header code data by encoding information necessary for decoding, such as the above-mentioned received information. The header code data corresponds to a header part of a bit stream and is output to the integration encoding unit 111.

FIG. 19A illustrates an example of a bit stream generated in the fifth embodiment. Transform and quantization arithmetic precision selection information and motion compensation arithmetic precision selection information are arranged as a transform and quantization arithmetic precision selection information code and a motion compensation arithmetic precision selection information code, respectively, within a header of either one of a sequence, a picture, and the like. Furthermore, bit depth information is arranged as a bit depth information code within a header of either one of a sequence, a picture, and the like.

However, the bit stream is not necessarily configured as described above. As illustrated in FIG. 19B, instead of encoding a motion compensation arithmetic precision selection information code and a transform and quantization arithmetic precision selection information code, a corresponding profile may be determined and the determined profile may be encoded as a profile information code. For example, it is assumed that a Main 10-bit profile and a Main 10-bit high-precision profile exist, that transform and quantization arithmetic precision selection information and motion compensation arithmetic precision selection information of the Main 10-bit profile are set to "0" and "0", respectively, and that transform and quantization arithmetic precision selection information and motion compensation arithmetic precision selection information of the Main 10-bit high-precision profile are set to "1" and "1", respectively. That is, implementation-oriented transform and quantization processing and implementation-oriented motion compensation processing are selected for the Main 10-bit profile, and precision-oriented transform and quantization processing and precision-oriented motion compensation processing are selected for the Main 10-bit high-precision profile. In this case, when each of the transform and quantization arithmetic precision selection information and the motion compensation arithmetic precision selection information represents "0", a code representing the Main 10-bit profile may be encoded as a profile information code. Meanwhile, when each of the transform and quantization arithmetic precision selection information and the motion compensation arithmetic precision selection information represents "1", a code representing the Main 10-bit high-precision profile may be encoded as a profile information code.

FIG. 13 is a flowchart illustrating an encoding process performed by the image encoding device according to the fifth embodiment. Steps having functions similar to those in the first embodiment illustrated in FIG. 5 and the third embodiment illustrated in FIG. 7 will be referred to with the same reference numerals and explanation for those similar steps will be omitted.

In step S1301, the input unit 902 analyzes the bit depth of received image data, and generates bit depth information. In step S1304, the header encoding unit 904 encodes information necessary for decoding to generate header code data. The information necessary for decoding includes the bit depth information generated in step S1301, the transform and quantization arithmetic precision selection information generated in step S502, and the motion compensation arithmetic precision selection information generated in step S722.

With the configuration and operation described above, in particular, information on the arithmetic precisions in encoding processing generated in steps S502 and S722 is encoded in step S1304. Therefore, a bit stream for which switching between encoding processes having different arithmetic precisions or different implementation costs can be performed according to the specifications required for an application, can be generated.

Although in the above description for the fifth embodiment, the encoding process is performed in the order of steps S508, S709, and S510, the encoding process is not necessarily performed in this order as long as step S510 is not performed earlier than step S507.

Furthermore, in the case where image data to be encoded has 8-bit depth, a transform and quantization arithmetic precision selection information code and a motion compensation arithmetic precision selection information code may be omitted. That is, in the case of 8-bit depth, since each of the transform and quantization arithmetic precision information and the motion compensation arithmetic precision information is uniquely set to be 0, a redundant code may be eliminated.

Furthermore, in the case of the above-mentioned Main 10-bit high-precision profile, a transform and quantization arithmetic precision selection information code and a motion compensation arithmetic precision selection information code may be provided so that selection between "0" and "1" can be performed. Therefore, selection of arithmetic precision can be performed even for a high-precision profile.

In the above description for the fifth embodiment, arithmetic precision in inverse-quantization and inverse-transform processing is determined in step S508 illustrated in FIG. 13 on the basis of the transform and quantization arithmetic precision information generated in step S503. However, obviously, the arithmetic precision calculated in step S507 may be used.

Furthermore, in the above description, the bit stream generated in the fifth embodiment is encoded in the order of the transform and quantization arithmetic precision selection information code, the motion compensation arithmetic precision selection information code, and the bit depth information code, as illustrated in FIG. 19A. However, the encoding is not necessarily performed in this order.

Furthermore, in the above description for the fifth embodiment, the motion compensation arithmetic precision information generating unit 323 and the transform and quantization arithmetic precision information generating unit 103 are provided independently. However, only an arithmetic precision information generating unit 1143 may be configured as illustrated in FIG. 11. In this case, arithmetic precision information generated in the arithmetic precision information generating unit 1143 is input to a prediction unit 1105, a transform and quantization unit 1106, an inverse-quantization and inverse-transform unit 1107, and an image reconstruction unit 1108, and processing based on the input arithmetic precision information is performed. Furthermore, a header encoding unit 1104 encodes arithmetic precision selection information and bit depth information.

Furthermore, in this case, a corresponding encoding process is performed as illustrated by a flowchart of FIG. 15. In FIG. 15, in step S1501, similar to step S501, the input unit 1101 analyzes bit depth. In step S1542, arithmetic precision selection information on each of transform and quantization processing and motion compensation processing is generated. In step S1543, arithmetic precision information on each of the transform and quantization processing and the motion compensation processing is generated. In step S1504, the arithmetic precision selection information is encoded. In steps S1506 and S1509, the motion compensation processing is performed on the basis of the arithmetic precision information generated in step S1543. In step S1507, the transform and quantization processing is performed on the basis of the arithmetic precision information generated in step S1543. In step S1508, inverse-quantization and inverse-transform processing is performed on the basis of the arithmetic precision information generated in step S1543.

As described above, instead of using transform and quantization arithmetic precision information and motion compensation arithmetic precision information for transform and quantization processing and motion compensation processing, respectively, common arithmetic precision information can be used.

In this case, an example of the generated bit stream is illustrated in FIG. 19C. Arithmetic precision selection information is arranged as an arithmetic precision selection information code within a header of either one of a sequence, a picture, and the like. Furthermore, as in the embodiments described above, instead of encoding arithmetic precision selection information as an arithmetic precision selection information code, a corresponding profile may be determined and the determined profile may be encoded as profile information. In this case, an example of the generated bit stream is illustrated in FIG. 19B.

Sixth Embodiment

FIG. 10 is a block diagram illustrating an image decoding device according to a sixth embodiment. In FIG. 10, units having functions similar to those in the second embodiment illustrated in FIG. 2 and the fourth embodiment illustrated in FIG. 4 will be referred to with the same reference numerals and explanation for those similar units will be omitted.

A header decoding unit 1003 decodes header code data separated from a bit stream, and reconstructs information on decoding processing.

An image decoding operation performed by the above-described image decoding device will now be described below. In the sixth embodiment, the bit stream generated in the fifth embodiment is decoded.

The header decoding unit 1003 decodes information necessary for decoding from the header code data received from the separating and decoding unit 202 to reconstruct motion compensation arithmetic precision selection information, transform and quantization arithmetic precision selection information, and bit depth information. The reconstructed motion compensation arithmetic precision selection information is output to the motion compensation arithmetic precision information setting unit 424, and the reconstructed transform and quantization arithmetic precision selection information is output to the transform and quantization arithmetic precision information setting unit 204. Furthermore, the reconstructed bit depth information is output to the transform and quantization arithmetic precision information setting unit 204 and the motion compensation arithmetic precision information setting unit 424.

FIG. 14 is a flowchart illustrating a decoding process performed by the image decoding device according to the sixth embodiment. Steps having functions similar to those in the second embodiment illustrated in FIG. 6 and the fourth embodiment illustrated in FIG. 8 will be referred to with the same reference numerals and explanation for those similar steps will be omitted.

In step S1402, the header decoding unit 1003 decodes information necessary for decoding from the header code data separated in step S601 to reconstruct motion compensation arithmetic precision selection information, transform and quantization arithmetic precision selection information, and bit depth information.

With the configuration and operation described above, in particular, decoding of motion compensation arithmetic precision selection information and transform and quantization arithmetic precision selection information on decoding processing can be performed in step S1402. Therefore, a bit stream for which decoding processes having different arithmetic precisions or different implementation costs can be performed according to the specifications required for the application generated in the fifth embodiment, can be decoded.

In the above description for the sixth embodiment, the bit stream input to the image decoding device is obtained by individually encoding the transform and quantization arithmetic precision selection information and the motion compensation arithmetic precision selection information illustrated in FIG. 19A. However, the bit stream is not necessarily configured as described above. For example, as illustrated in FIG. 19B, instead of encoding a transform and quantization arithmetic precision selection information code and a motion compensation arithmetic precision selection information code, a profile information code representing a corresponding profile may be encoded. In this case, the motion compensation arithmetic precision information setting unit 424 and the transform and quantization arithmetic precision information setting unit 204 generate motion compensation arithmetic precision information and transform and quantization arithmetic precision information on the basis of the profile information code and bit depth information.

Furthermore, although the transform and quantization arithmetic precision information setting unit 204 and the motion compensation arithmetic precision information setting unit 424 are independently provided in the sixth embodiment, only an arithmetic precision information setting unit 1244 may be provided as illustrated in FIG. 12. In this case, arithmetic precision information set by the arithmetic precision information setting unit 1244 is input to an inverse-quantization and inverse-transform unit 1206 and an image reconstruction unit 1207, and processing based on the input arithmetic precision information is performed.

Furthermore, in this case, a corresponding decoding process is performed as illustrated by a flowchart of FIG. 16. In FIG. 16, in step S1602, arithmetic precision selection information is decoded. In step S1643, arithmetic precision information on each of inverse-quantization and inverse-transform processing and motion compensation processing is reconstructed. In step S1644, arithmetic precision information on each of the inverse-quantization and inverse-transform processing and the motion compensation processing is reconstructed and determined on the basis of the reconstructed arithmetic precision information. In steps S1606 and S1607, inverse-quantization and inverse-transform processing and motion compensation processing are performed in accordance with the corresponding arithmetic precision information determined in step S1644. As described above, instead of using transform and quantization arithmetic precision information and motion compensation arithmetic precision information for transform and quantization processing and motion compensation processing, respectively, common arithmetic precision information may be used.

In this case, an example of the received bit stream is illustrated in FIG. 19C, and the transform and quantization arithmetic precision selection information and the motion compensation arithmetic precision selection information are individually encoded. However, the bit stream is not necessarily configured as described above. As in the foregoing embodiments, instead of encoding arithmetic precision selection information as an arithmetic precision selection information code, a corresponding profile may be encoded as profile information. In this case, an example of the received bit stream is illustrated in FIG. 19B.

Seventh Embodiment

In the foregoing embodiments, explanations have been provided on the assumption that the processing units illustrated in FIGS. 1, 2, 3, 4, 9, 10, 11, and 12 are configured as hardware. However, processing performed by the processing units illustrated in FIGS. 1, 2, 3, 4, 9, 10, 11, and 12 may be configured as computer programs.

FIG. 20 is a block diagram illustrating an example of a hardware configuration of a computer that is applicable to an image display device according to each of the foregoing embodiments.

A central processing unit (CPU) 2001 controls the entire computer using a computer program and data stored in a random access memory (RAM) 2002 and a read only memory (ROM) 2003, and performs the processes described as being performed by the image processing devices according to the foregoing embodiments. That is, the CPU 2001 functions as the processing units illustrated in FIGS. 1, 2, 3, 4, 9, 10, 11, and 12.

The RAM 2002 includes an area for temporarily storing a computer program and data loaded from an external storage device 2006, data externally acquired via an interface (I/F), and the like. The RAM 2002 also includes a work area to be used when the CPU 2001 performs various processes. That is, for example, the RAM 2002 can be used as a frame memory or may appropriately provide other various areas.

The ROM 2003 stores setting data, a boot program, and the like of the computer. An operation unit 2004 includes a keyboard, a mouse, and the like. When a user of the computer operates the operation unit 2004, various instructions can be input to the CPU 2001. An output unit 2005 displays a processing result by the CPU 2001. Furthermore, the output unit 2005 includes, for example, a liquid crystal display.

The external storage device 2006 is a mass information storage device typified by a hard disk drive device. An operating system (OS) and a computer program for causing the CPU 2001 to implement functions of the units illustrated in FIGS. 1, 2, 3, 4, 9, 10, 11, and 12 are stored in the external storage device 2006. Various image data to be processed may also be stored in the external storage device 2006.

The computer program and data stored in the external storage device 2006 are appropriately loaded to the RAM 2002 under the control of the CPU 2001 and become targets to be processed by the CPU 2001. A network, such as a local area network (LAN) or the Internet, or a device, such as a projection device or a display device, may be connected to the I/F 2007. The computer is capable of acquiring and sending various types of information via the I/F 2007. A bus 2008 connects the above-described units.

The operation configured as described above controls the operation explained with reference to the flowcharts described above mainly by the CPU 2001.

Furthermore, the present invention may also be implemented by the processing described below, that is, processing for supplying software (program) implementing functions of the foregoing embodiments to a system or an apparatus via a network or various storage media and causing a computer (or a CPU, a microprocessing unit (MPU), or the like) of the system or the apparatus to read and execute the program.

According to the present invention, encoding and decoding that support both an encoding process which maintains a constant precision even at a high bit depth regardless of the bit depth of an image and an encoding process which is dependent on the bit depth by reducing arithmetic precision so that the easiness of implementation is emphasized, can be realized. Consequently, switching between these encoding processes can be performed according to the specifications required for an application.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-287785, filed Dec. 28, 2012, which is hereby incorporated by reference herein in its entirety.

The invention claimed is:
1. An image encoding device which encodes an image into a bit stream, the image encoding device comprising:
a prediction unit configured to perform prediction for an image to generate prediction errors;
a transform unit configured to perform orthogonal transform on the prediction errors to generate transform coefficients;
a quantization unit configured to perform quantization on the transform coefficients to generate quantized coefficients;
a first encoding unit configured to encode the quantized coefficients; and
a second encoding unit configured to encode first information and second information into the bitstream,
wherein the first information indicates a bit depth, and
wherein the second information indicates whether minimum and maximum values of at least either the transform coefficients or the quantized coefficients are (i) to be fixed values regardless of the bit depth or (ii) to be determined based on the bit depth, in encoding using a profile which encodes an image having a bit depth of 10 bits.
2. The image encoding device according to claim 1, wherein the second information indicates whether minimum and maximum values of the transform coefficients are to be determined based on the bit depth or to be fixed values regardless of the bit depth.
3. The image encoding device according to claim 1, wherein the second information indicates whether minimum and maximum values of quantized coefficients are to be determined based on the bit depth or to be fixed values regardless of the bit depth.
4. The image encoding device according to claim 1, wherein the transform unit performs orthogonal transform on the prediction errors based on the second information.
5. The image encoding device according to claim 1, wherein the quantization unit performs quantization on the transform coefficients based on the second information.
6. The image encoding device according to claim 1, wherein the second information indicates that, in the case where a first image having a bit depth and a second image having a bit depth different from the bit depth of the first image are received, minimum and maximum values of the transform coefficients corresponding to the first image and the minimum and maximum values of the transform coefficients corresponding to the second image are equal to or different from each other.

7. The image encoding device according to claim 1, wherein the second information indicates that, in the case where a first image having a bit depth and a second image having a bit depth different from the bit depth of the first image are received, minimum and maximum values of the quantized coefficients corresponding to the first image and minimum and maximum values of the quantized coefficients corresponding to the second image are equal to or different from each other.

8. The image encoding device according to claim 1, wherein the bit depth is to be indicated by a difference value between a bit depth of the image and a reference bit depth.

9. The image encoding device according to claim 1, wherein the minimum and maximum values of the transform coefficients are minimum and maximum values of a result of one-dimensional orthogonal transform in the horizontal direction performed on coefficients of the prediction errors.

10. The image encoding device according to claim 1, wherein the minimum and maximum values of the transform coefficients are minimum and maximum values of a result of one-dimensional orthogonal transform in the vertical direction performed on coefficients of the prediction errors.

11. The image encoding device according to claim 1, wherein the second encoding unit encodes the second information as a profile representing a combination of processes for which decoding is capable of being performed in a corresponding image decoding device.

12. A non-transitory computer-readable medium storing a program for causing a computer to function as the image encoding device according to claim 1 when the computer reads and executes the program.

13. The image encoding device according to claim 1, wherein the second encoding unit is configured to encode both of the first information and the second information into a header for a sequence in the bit stream.

14. An image decoding device which decodes an image from a bit stream, the image decoding device comprising:
a first decoding unit configured to decode quantized coefficients from a bit stream including data of an encoded image;
an inverse-quantization unit configured to perform inverse-quantization on the quantized coefficients to derive transform coefficients;
an inverse-transform unit configured to perform inverse-orthogonal transform on the transform coefficients to derive prediction errors; and
a second decoding unit configured to decode first information and second information from the bit stream,
wherein the first information indicates a bit depth, and
wherein the second information indicates whether minimum and maximum values of at least either of the transform coefficients or the quantized coefficients are (i) fixed values regardless of the bit depth or (ii) determined based on the bit depth, in decoding using a profile which decodes an image having a bit depth of 10 bits.

15. The image decoding device according to claim 14, further comprising a reconstruction unit configured to perform prediction based on decoded pixels, generate a prediction image, and reconstruct an image on the basis of the prediction image and the prediction errors,
wherein the bit depth is a bit depth of the reconstructed image.

16. The image decoding device according to claim 14, wherein the inverse-transform unit performs inverse-orthogonal transform on the transform coefficients based on the second information.

17. The image decoding device according to claim 14, wherein
the inverse-quantization unit performs inverse-quantization on the quantized coefficients based on the second information.

18. The image decoding device according to claim 14, wherein
the second information indicates that, in the case where a first bit stream from which a first image is reconstructed by decoding and a second bit stream from which a second image having a bit depth different from a bit depth of the first image is reconstructed by decoding are received, minimum and maximum values of the transform coefficients corresponding to the first bit stream and minimum and maximum values of the transform coefficients corresponding to the second bit stream are equal to or different from each other.

19. The image decoding device according to claim 18, wherein
the first bit stream includes information representing a bit depth of the first image and the second bit stream includes information representing a bit depth of the second image.

20. The image decoding device according to claim 14, wherein
the second information indicates that, in the case where a first bit stream from which a first image is reconstructed by decoding and a second bit stream from which a second image having a bit depth different from a bit depth of the first image is reconstructed by decoding are received, minimum and maximum values of the quantized coefficients corresponding to the first bit stream and minimum and maximum values of the quantized coefficients corresponding to the second bit stream are equal to or different from each other.

21. The image decoding device according to claim 14, further comprising a reconstruction unit configured to perform prediction based on decoded pixels, generate a prediction image, and reconstruct an image on the basis of the prediction image and the prediction errors,
wherein the bit depth is indicated by a difference value between a bit depth of the reconstructed image and a reference bit depth.

22. The image decoding device according to claim 14, wherein
the second decoding unit decodes a profile data being included in the received bit stream and representing a combination of processes for which decoding is capable of being performed in the image decoding device, and calculates the information on the basis of the profile.

23. A non-transitory computer-readable medium storing a program for causing a computer to function as the image decoding device according to claim 14 when the computer reads and executes the program.

24. The image decoding device according to claim 14, wherein the second decoding unit is configured to decode both of the first information and the second information from a header for a sequence in the bit stream.

25. An image encoding method which encodes an image into a bit stream, the image encoding method comprising:
a prediction step of performing prediction for an image to generate prediction errors;
a transform step of performing orthogonal transform on the prediction errors to generate transform coefficients;

a quantization step of performing quantization on the transform coefficients to generate quantized coefficients;
a first encoding step of encoding the quantized coefficients; and
a second encoding step of encoding first information and second information into the bit stream,
wherein the first information indicates a bit depth, and
wherein the second information indicates whether minimum and maximum values of at least either the transform coefficients or the quantized coefficients are (i) to be fixed values regardless of the bit depth or (ii) to be determined based on the bit depth, in encoding using a profile which encodes an image having a bit depth of 10 bits.

26. An image decoding method which decodes an image from a bit stream, the image decoding method comprising:
a first decoding step of decoding quantized coefficients from a bit stream including data of an encoded image;
an inverse-quantization step of performing inverse-quantization on the quantized coefficients to derive transform coefficients;
an inverse-transform step configured to perform inverse-orthogonal transform on the transform coefficients to derive prediction errors; and
a second decoding step of decoding first information and second information from the bit stream,
wherein the first information indicates a bit depth, and
wherein the second information indicates whether minimum and maximum values of at least either of the transform coefficients or the quantized coefficients are (i) fixed values regardless of the bit depth or (ii) determined based on the bit depth, in decoding using a profile which decodes an image having a bit depth of 10 bits.

27. An image encoding device which encodes an image into a bit stream, the image encoding device comprising:
a prediction unit configured to perform prediction for an image to generate prediction errors;
a transform unit configured to perform orthogonal transform on the prediction errors to generate transform coefficients;
a quantization unit configured to perform quantization on the transform coefficients to generate quantized coefficients;
a first encoding unit configured to encode the quantized coefficients; and
a second encoding unit configured to encode first information and second information into the bitstream,
wherein the first information indicates a bit depth, and
wherein the second information indicates whether minimum and maximum values of at least either the transform coefficients or the quantized coefficients are (i) to be fixed values regardless of the bit depth or (ii) to be determined based on the bit depth, in encoding using a profile in which the image encoding device selects the bit depth from a plurality of bit depths including a bit depth of 10 bits.

28. The image encoding device according to claim 27, wherein the transform unit performs orthogonal transform on the prediction errors based on the second information.

29. The image encoding device according to claim 27, wherein the quantization unit performs quantization on the transform coefficients based on the second information.

30. The image encoding device according to claim 27, wherein the bit depth is to be indicated by a difference value between a bit depth of the image and a reference bit depth.

31. The image encoding device according to claim 27, wherein the second encoding unit is configured to encode both of the first information and the second information into a header for a sequence in the bit stream.

32. An image decoding device which decodes an image from a bit stream, the image decoding device comprising:
a first decoding unit configured to decode quantized coefficients from a bit stream including data of an encoded image;
an inverse-quantization unit configured to perform inverse-quantization on the quantized coefficients to derive transform coefficients; an inverse-transform unit configured to perform inverse-orthogonal transform on the transform coefficients to derive prediction errors; and
a second decoding unit configured to decode first information and second information from the bit stream,
wherein the first information indicates a bit depth, and
wherein the second information indicates whether minimum and maximum values of at least either of the transform coefficients or the quantized coefficients are (i) fixed values regardless of the bit depth or (ii) determined based on the bit depth, in decoding using a profile in which the first information indicates one of a plurality of bit depths including a bit depth of 10 bits.

33. The image decoding device according to claim 32, further comprising a reconstruction unit configured to perform prediction based on decoded pixels, generate a prediction image, and reconstruct an image on the basis of the prediction image and the prediction errors,
wherein the bit depth is a bit depth of the reconstructed image.

34. The image decoding device according to claim 32, wherein the inverse-transform unit performs inverse-orthogonal transform on the transform coefficients based on the second information.

35. The image decoding device according to claim 32, wherein the inverse-quantization unit performs inverse-quantization on the quantized coefficients based on the second information.

36. The image decoding device according to claim 32, wherein the first bit stream includes information representing a bit depth of the first image and the second bit stream includes information representing a bit depth of the second image.

37. The image decoding device according to claim 32, further comprising a reconstruction unit configured to perform prediction based on decoded pixels, generate a prediction image, and reconstruct an image on the basis of the prediction image and the prediction errors, wherein the bit depth is indicated by a difference value between a bit depth of the reconstructed image and a reference bit depth.

38. The image decoding device according to claim 32, wherein the second decoding unit is configured to decode both of the first information and the second information from a header for a sequence in the bit stream.

39. An image encoding method which encodes an image into a bit stream, the image encoding method comprising:
a prediction step of performing prediction for an image to generate prediction errors;
a transform step of performing orthogonal transform on the prediction errors to generate transform coefficients;
a quantization step of performing quantization on the transform coefficients to generate quantized coefficients; a first encoding step of encoding the quantized coefficients; and a second encoding step of encoding first information and second information into the bit stream, wherein the first information indicates a bit depth, and wherein the second information indicates whether minimum and maximum values of at least either the transform coefficients or the quantized coefficients are (i) to be fixed values regardless of the bit depth or (ii) to be determined based on the bit depth, in encoding using a profile in which the image encoding device selects the bit depth from a plurality of bit depths including a bit depth of 10 bits.

40. An image decoding method which decodes an image from a bit stream, the image decoding method comprising:

a first decoding step of decoding quantized coefficients from a bit stream including data of an encoded image;

an inverse-quantization step of performing inverse-quantization on the quantized coefficients to derive transform coefficients; an inverse-transform step configured to perform inverse-orthogonal transform on the transform coefficients to derive prediction errors; and a second decoding step of decoding first information and second information from the bit stream, wherein the first information indicates a bit depth, and wherein the second information indicates whether minimum and maximum values of at least either of the transform coefficients or the quantized coefficients are (i) fixed values regardless of the bit depth or (ii) determined based on the bit depth, in decoding using a profile in which the first information indicates one of a plurality of bit depths including a bit depth of 10 bits.

41. A non-transitory computer-readable medium storing a program for causing a computer to function as the image encoding device according to claim 27 when the computer reads and executes the program.

42. A non-transitory computer-readable medium storing a program for causing a computer to function as the image decoding device according to claim 32 when the computer reads and executes the program.

* * * * *